United States Patent
Hoshina et al.

(10) Patent No.: US 11,984,593 B2
(45) Date of Patent: May 14, 2024

(54) SECONDARY BATTERY, BATTERY PACK, AND VEHICLE

(71) Applicant: KABUSHIKI KAISHA TOSHIBA, Tokyo (JP)

(72) Inventors: Keigo Hoshina, Yokohama (JP); Yasunobu Yamashita, Tokyo (JP); Shinsuke Matsuno, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 432 days.

(21) Appl. No.: 17/009,927

(22) Filed: Sep. 2, 2020

(65) Prior Publication Data
US 2021/0296643 A1    Sep. 23, 2021

(30) Foreign Application Priority Data

Mar. 19, 2020  (JP) .................................. 2020-048662

(51) Int. Cl.
*H01M 4/525*    (2010.01)
*H01M 4/131*    (2010.01)
(Continued)

(52) U.S. Cl.
CPC ........... *H01M 4/525* (2013.01); *H01M 4/131* (2013.01); *H01M 4/133* (2013.01); *H01M 4/134* (2013.01);
(Continued)

(58) Field of Classification Search
CPC .................. H01M 4/133; H01M 10/46; H01M 2004/021; H01M 2300/0071; Y02P 70/50
See application file for complete search history.

(56) References Cited

U.S. PATENT DOCUMENTS

| | | | |
|---|---|---|---|
| 7,931,989 B2* | 4/2011 | Klaassen | H01M 4/382 |
| | | | 429/300 |
| 9,455,445 B2* | 9/2016 | Koga | H01M 4/5825 |
| | (Continued) | | |

FOREIGN PATENT DOCUMENTS

| | | | |
|---|---|---|---|
| DK | 102016013809 A | * | 5/2017 |
| EP | 1 120 850 A1 | | 8/2001 |
| | (Continued) | | |

OTHER PUBLICATIONS

Machine translation of JP2000315526A originally published to Ishizaki et al. on Nov. 2000 (Year: 2000).*
(Continued)

*Primary Examiner* — Cynthia H Kelly
*Assistant Examiner* — Tarik J Phillip
(74) *Attorney, Agent, or Firm* — Oblon, McClelland, Maier & Neustadt, L.L.P.

(57) ABSTRACT

According to one embodiment, a secondary battery including a positive electrode, a negative electrode, an insulating layer, and a nonaqueous electrolyte is provided. The positive electrode includes a positive electrode active material-containing layer containing a lithium nickel cobalt manganese composite oxide. The negative electrode includes a negative electrode active material-containing layer having a first surface. The insulating layer includes a solid electrolyte layer having a second surface that is at least partly opposed to or partly in contact with the first surface and containing a Li ion conductive oxide. At least part of the second surface or the first and second surfaces includes a Mn-containing substance. An abundance ratio of Mn on the second surface is higher than that on the first surface.

12 Claims, 8 Drawing Sheets

(51) Int. Cl.
  *H01M 4/133* (2010.01)
  *H01M 4/134* (2010.01)
  *H01M 4/36* (2006.01)
  *H01M 4/505* (2010.01)
  *H01M 10/0525* (2010.01)
  *H01M 50/20* (2021.01)
  *H01M 4/02* (2006.01)

(52) U.S. Cl.
  CPC .......... *H01M 4/366* (2013.01); *H01M 4/505* (2013.01); *H01M 10/0525* (2013.01); *H01M 50/20* (2021.01); *H01M 2004/021* (2013.01); *H01M 2004/027* (2013.01); *H01M 2004/028* (2013.01); *H01M 2300/0071* (2013.01)

(56) References Cited

U.S. PATENT DOCUMENTS

| | | | |
|---|---|---|---|
| 9,774,030 B2 * | 9/2017 | Matsuno | H01M 4/485 |
| 2016/0226067 A1 * | 8/2016 | Harada et al. | H01M 4/36 |
| | | | 131/133 |
| 2017/0005367 A1 * | 1/2017 | Van Berkel | H01M 10/0562 |
| 2017/0012264 A1 * | 1/2017 | Carlson | H01G 11/20 |
| 2018/0083279 A1 * | 3/2018 | Takami | H01M 4/505 |
| 2019/0088982 A1 | 3/2019 | Sugizaki et al. | |

FOREIGN PATENT DOCUMENTS

| | | |
|---|---|---|
| EP | 2 626 944 A1 | 8/2013 |
| EP | 2 980 886 A1 | 2/2016 |
| EP | 2 980 895 A1 | 2/2016 |
| EP | 3 125 339 A1 | 2/2017 |
| JP | 2000-77103 A | 3/2000 |
| JP | 2000-315526 A | 11/2000 |
| JP | 2016-51583 A | 4/2016 |
| JP | 2018-163893 A | 10/2018 |
| JP | 2019-57399 A | 4/2019 |
| WO | WO 2016/120266 A1 | 8/2016 |

OTHER PUBLICATIONS

Machine trabslation of DE102016013809A published to Hintennach on May 2017 (Year: 2017).*

Battery Seperators, Chemical Review published Oct. 13, 2004 (Year: 2004).*

Nakai, I. et al., "Funmatsu X sen Kaisetsu no Jissai (Reality of Powder X-Ray Analysis)," X-Ray Analysis Investigation Conversazione, The Japan Society for Analytical Chemistry, 1$^{st}$ Edition, 2002, 33 pages (with English Machine Translation).

* cited by examiner

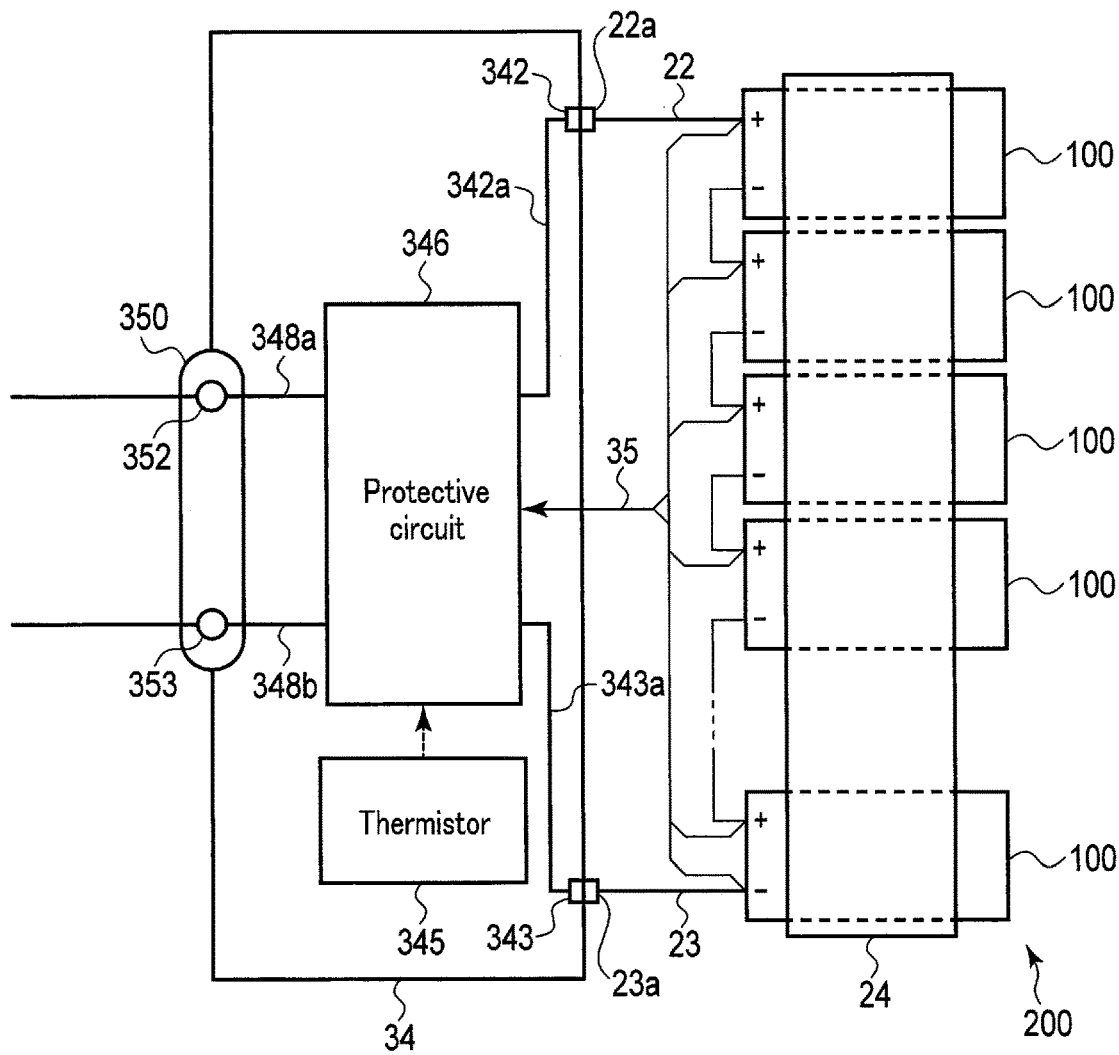
F I G. 9
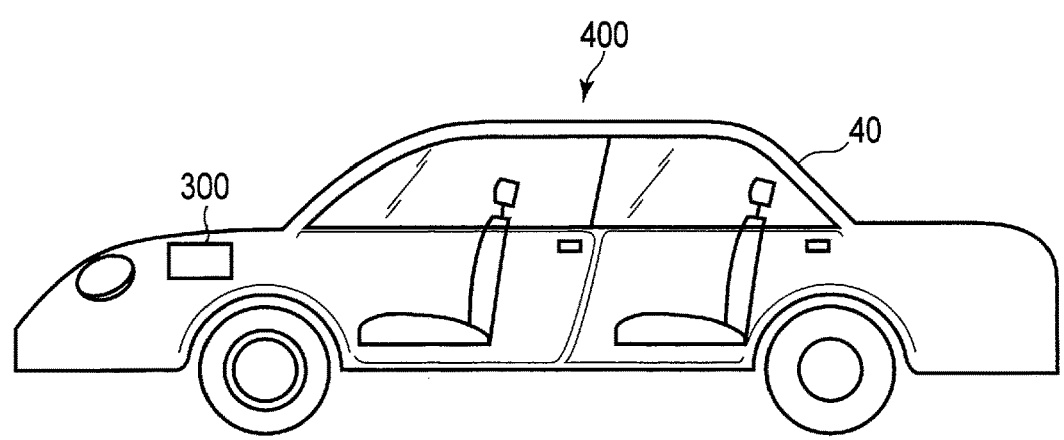
F I G. 10

SECONDARY BATTERY, BATTERY PACK, AND VEHICLE

CROSS-REFERENCE TO RELATED APPLICATION

This application is based upon and claims the benefit of priority from Japanese Patent Application No. 2020-048662, filed Mar. 19, 2020, the entire content of which is incorporated herein by reference.

FIELD

The present disclosure relates to a secondary battery, battery pack, and vehicle.

BACKGROUND

For secondary batteries such as lithium ion secondary batteries, improvement of energy density has been investigated. As means for realizing high energy density cells, for example, combining a negative electrode using graphite and a positive electrode using a lithium nickel cobalt manganese composite oxide having a high nickel content (so-called high nickel) respectively as electrode active materials, and at the same time increasing thicknesses and densities of electrodes. An electrolytic solution does not easily permeate into the interior of a thick and dense electrode. Due to this, a diffusion rate of carrier ions (for example, lithium ions) in the electrolytic solution becomes rate-determining for a charge-discharge reaction, leading to an uneven reaction distribution. The thicker and denser the electrode is, the more the reaction distribution tends to be uneven. In a graphite negative electrode, an uneven reaction distribution raises a problem of lithium precipitation. In a high nickel positive electrode, an uneven reaction distribution may cause deterioration of active materials and oxidation of an electrolytic solution. Furthermore, manganese (Mn) may be eluted from the positive electrode, and this eluted Mn may result in formation of an excessive coating on the negative electrode. For these reasons, in the graphite/high nickel cell, an uneven reaction distribution in the electrode leads to deterioration of the cycle life.

BRIEF DESCRIPTION OF THE DRAWINGS

FIG. 9 is a block diagram showing an example of an electric circuit of the battery pack shown in FIG. 8;

FIG. 10 is a partially see-through diagram schematically showing an example of a vehicle according to an embodiment.

DETAILED DESCRIPTION

Figure 1:
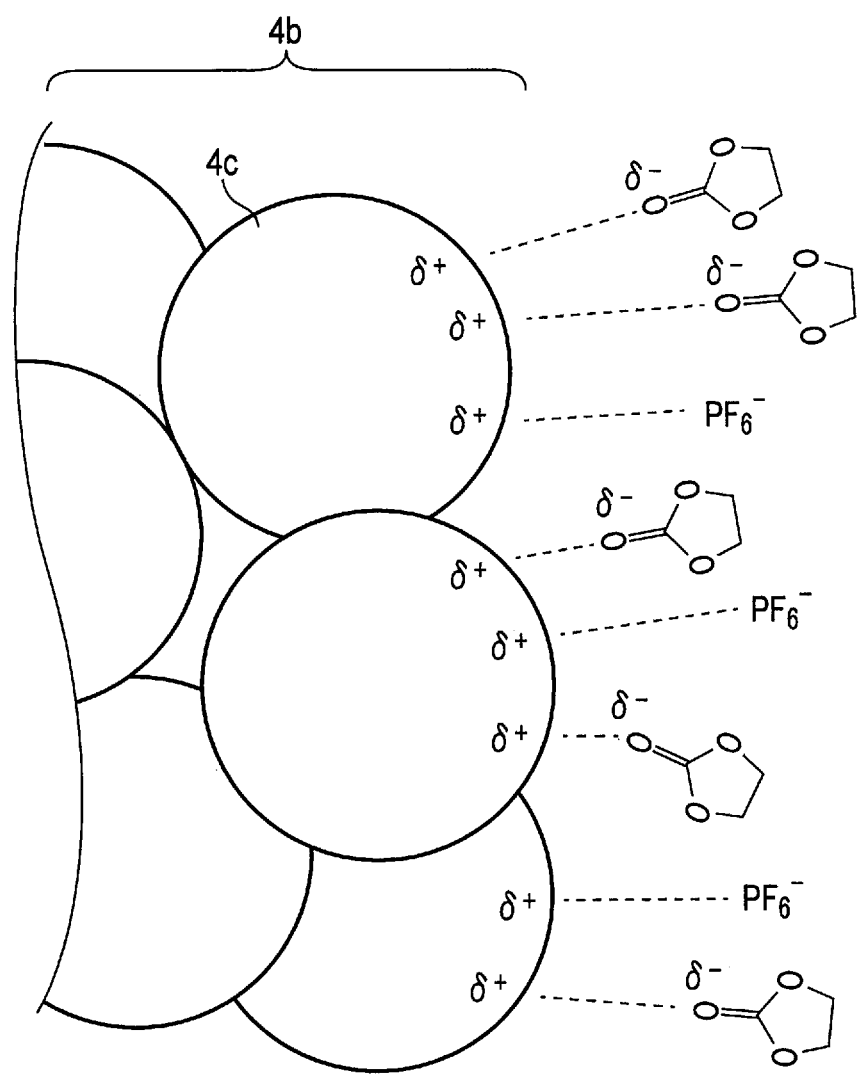
FIG. 1 is a schematic view illustrating an interface between a solid electrolyte and a liquid electrolyte.

According to one embodiment, a secondary battery including a positive electrode, a negative electrode, an insulating layer, and a nonaqueous electrolyte is provided. The positive electrode includes a positive electrode active material-containing layer which contains a lithium nickel cobalt manganese composite oxide. The negative electrode includes a negative electrode active material-containing layer that has a first surface. The insulating layer includes a solid electrolyte layer that has a second surface that is at least partly opposed to or partly in contact with the first surface. The solid electrolyte layer contains a Li ion conductive oxide. At least part of the second surface or the first and second surfaces includes a Mn-containing substance. An abundance ratio of Mn on the second surface is higher than an abundance ratio of Mn on the first surface.

According to another embodiment, a battery pack including the secondary battery according to the embodiment is provided.

According to still another embodiment, a vehicle including the battery pack according to the embodiment is provided.

Since an uneven reaction distribution in an electrode deteriorates cycle life, as described above, it is desirable to make the reaction distribution uniform. Examples of means for making the reaction distribution uniform includes using a low-viscosity electrolytic solution and increasing a void fraction of a separator to thereby promote movement of carrier ions (Li ions, etc.). However, on one hand, the low-viscosity electrolytic solution entails problems such as ease of oxidization. On the other hand, the increase in the void fraction of the separator makes fine short circuits more liable to occur, reducing safety.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

First Embodiment

A secondary battery according to the first embodiment includes a positive electrode, a negative electrode, an insulating layer, and a nonaqueous electrolyte. The positive electrode includes a positive electrode active material-containing layer, and this positive electrode active material-containing layer contains a lithium nickel cobalt manganese composite oxide. The negative electrode includes a negative electrode active material-containing layer having a first surface. The insulating layer includes a solid electrolyte layer having a second surface that is at least partly opposed to or partly in contact with the first surface of the negative electrode active material-containing layer. The solid electrolyte layer contains a Li ion conductive oxide. A Mn-containing substance is present on at least part of the second surface of the solid electrolyte layer, or at least parts of both the first surface of the negative electrode active material-containing layer and the second surface. An abundance ratio of Mn on the second surface is higher than an abundance ratio of Mn on the first surface.

The negative electrode, the positive electrode, and the insulating layer may constitute an electrode group. The nonaqueous electrolyte (for example, liquid or gel electrolyte) may be held in the electrode group.

The secondary battery according to the embodiment may further include a container member that houses the electrode group and the nonaqueous electrolyte.

The secondary battery according to the embodiment may further include a negative electrode terminal electrically connected to the negative electrode, and a positive electrode terminal electrically connected to the positive electrode.

The secondary battery according to the embodiment may be, for example, a lithium secondary battery. The secondary battery may include a nonaqueous electrolyte secondary battery.

In the secondary battery of the above-described structure, the insulating layer contains the Li ion conductive oxide in the solid electrolyte layer, whereby the reaction distribution in the electrode can be made uniform. The Li ion conductive oxide contained in the solid electrolyte layer can function as a solid electrolyte in a lithium ion secondary battery, for example. Because the Li ion conductive oxide is able to assist transportation of lithium ions contained in a liquid nonaqueous electrolyte or gel nonaqueous electrolyte, the reaction distribution in the positive and negative electrodes can be made uniform. A mechanism thereof will be described with reference to FIG. 1.

FIG. 1 is a schematic view illustrating an interface between a solid electrolyte and a nonaqueous electrolyte. A solid electrolyte layer 4b is illustrated on the left side of the figure. Solid electrolyte particles 4c represent a Li ion conductive oxide in the solid electrolyte layer 4b. The surface of the solid electrolyte layer 4b depicted on the right side may be opposed to or in contact with a surface of an electrode active material-containing layer; however, an illustration of the active material-containing layer is omitted in this figure. While details of the nonaqueous electrolyte will be described later, the nonaqueous electrolyte is a liquid electrolyte (electrolytic solution) or a gel electrolyte, and may contain a solvent and electrolyte salt.

The solid electrolyte particles 4c can have positive charge (δ+) induced, and therefore able to attract solvent molecules and electrolyte anions contained in the nonaqueous electrolyte. In the illustrated example, ethylene carbonate molecules having high polarity are illustrated as solvent molecules, but solvents that can be contained in the nonaqueous electrolyte are not limited to this. Furthermore, hexafluorophosphate anions ($PF_6^-$) having high polarity are illustrated as electrolyte anions, but electrolyte anions that can be contained in the nonaqueous electrolyte are not limited to this. Moreover, because the solvent molecules and electrolyte anions are attracted to the solid electrolyte particles 4c, interaction between solvent molecules and Li ions ($Li^+$) and interaction between electrolytes and Li ions in the nonaqueous electrolyte are alleviated. As a result, Li ions can move more freely within the nonaqueous electrolyte, and thus, the diffusion rate of Li ions is improved. In addition, attraction of the solvent molecules and electrolyte anions to the solid electrolyte particles 4c provides the advantageous effect of reducing side reactions at the electrode, such as a nonaqueous electrolyte decomposition reaction, excessive coating formation, and Li precipitation. Suppression of the nonaqueous electrolyte decomposition leads to a reduction of Mn elution from the positive electrode, too.

When the Mn-containing substance is contained on the second surface of the solid electrolyte layer, and the abundance ratio of Mn on the second surface is higher than that on the first surface of the negative electrode active material-containing layer, the effect of making the reaction distribution in the positive and negative electrodes uniform can be further promoted. The reason therefor is as follows.

The negative electrode active material-containing layer has, for example, a strip shape or a flat-plate shape including one principal surface and another principal surface on a reverse side thereof. The solid electrolyte layer may have, for example, a strip shape or a flat-plate shape including one principal surface and another principal surface on a reverse side thereof. The first surface of the negative electrode active material-containing layer and the second surface of the solid electrolyte layer are at least partly opposed with respect to one another or at least partly in contact. For example, one principal surface of the negative electrode active material-containing layer and one principal surface of the solid electrolyte layer at least partially face one another or are at least partially in contact with one another. In the insulating layer, the solid electrolyte layer may be supported on the substrate; in this case, as the second surface, the surface not facing toward the substrate is at least partly opposed to or in contact with the first surface of the negative electrode active material-containing layer.

Of the surfaces of the solid electrolyte layer, on at least a part of the surface at least partly opposed to or in contact with one of the surfaces of the negative electrode active material-containing layer, i.e., at least part of the second surface, a small amount of the Mn-containing substance is present. A small amount of Mn-containing substance may be present also on at least part of the surface of the negative electrode active material-containing layer at least partly opposed to or in contact with the second surface, i.e., at least part of the first surface. The abundance ratio of Mn on the second surface is larger than an abundance ratio of Mn on the first surface. That is, at the boundary between the negative electrode active material-containing layer and the solid electrolyte layer, the amount of the Mn-containing substance is larger on the solid electrolyte layer side. If no Mn-containing substance is present on the negative electrode active material-containing layer side, the abundance ratio of Mn on the first surface may be zero. As a matter of course, in this case, the abundance ratio of Mn on the second surface that is larger than zero would be larger. The Mn-containing substance may be present on the surface of the solid electrolyte layer facing the positive electrode side, also.

The Mn-containing substance that is present on the second surface and may be present also on the first surface includes, for example, a Mn-containing compound such as $MnO$, $MnO_2$, and $MnF_2$. Since the Mn-containing substance can have positive charge, polar solvents and anions may be attracted to the Mn-containing substance, as well. With the second surface of the solid electrolyte layer having a greater amount of the Mn-containing substance than the first surface of the negative electrode active material-containing layer, the effect of attracting solvent molecules and electrolyte anions by the solid electrolyte particles (particles of Li ion conductive oxide) increases.

The amount of the Mn-containing substance present on the surface of the solid electrolyte layer including the second surface and the surface of the negative electrode active material-containing layer including the first surface is desirably not too large. By limiting the Mn-containing substance to a small amount, it is possible to suppress the side reaction between the Mn-containing substance and the electrolyte solvent, and the side reaction between the Mn-containing substance and the electrolyte anion.

The ratio of the abundance ratio of the Mn-containing substance present on the first surface with respect to the abundance ratio of the Mn-containing substance present on the second surface (abundance ratio of Mn-containing substance on first surface/abundance ratio of Mn-containing substance on second surface) is preferably from 0 to 0.3. When the ratio is within this range, the solvent molecules and electrolyte anions are more readily attracted to the solid electrolyte layer side, and not to the negative electrode active material-containing layer surface, making it possible to further suppress the decomposition reaction of the nonaqueous electrolyte, and thus preferable.

By making the reaction distribution in the positive electrode uniform, deterioration of active materials, oxidation reaction of the liquid electrolyte, and elution of manganese (Mn) can be suppressed at the positive electrode. Suppression of Mn elution leads to a reduction of excessive coating formation at the negative electrode, as well. By making the reaction distribution in the negative electrode uniform, for example, when a carbon material such as graphite is used for the negative electrode active material, lithium precipitation in the negative electrode can be suppressed.

In order to provide a small amount of Mn-containing substance on the second surface of the solid electrolyte layer so that the abundance ratio of Mn on the second surface of the solid electrolyte layer is larger than the abundance ratio of Mn on the first surface of the negative electrode active material-containing layer, an assembled battery can be subjected to an aging treatment under the following conditions.

The aging treatment for forming the Mn-containing substance includes a first storing treatment and a second storing treatment. In the first storing treatment, while a state of charge (SOC) of the assembled battery is adjusted to be from 90% to 100%, the battery is stored in an environment of from 20° C. to 60° C. for 3 hours or more. In the second storing treatment, the battery readjusted to a SOC of from 30% to 80% after the first storing treatment is stored in an environment of from 20° C. to 60° C. for 10 hours or more. Through these first and second storing treatments, the Mn-containing substance is formed in the battery. In the first storing treatment, Mn is eluted from the positive electrode containing the lithium nickel cobalt manganese composite oxide in a high SOC state. In the second storing treatment, Mn eluted into the nonaqueous electrolyte is deposited onto the solid electrolyte layer surface (second surface) that faces the negative electrode. Both the first and second storing treatments are each performed with the battery in a sealed state. In the first storing treatment and/or second storing treatment, gas may be generated within the sealed space of the battery. After the first storing treatment, the battery may be temporarily unsealed before the SOC is adjusted for the second storing treatment to remove the gas generated in the battery. After the second storing treatment, too, the battery may be unsealed to remove gas.

By performing the first and second storing treatments under the above-described conditions, a suitable amount of Mn-containing substance can be made present on the boundary part between the solid electrolyte layer and the negative electrode active material-containing layer. Of the Mn-containing substance formed, when the above-described treatment conditions are satisfied, an amount of the Mn-containing substance formed in the form of being adhered to the second surface of the solid electrolyte layer is greater than that adhered to the first surface of the negative electrode active material-containing layer. In this manner, obtained is a state in which the abundance ratio of Mn on the second surface is higher than that on the first surface.

(Measurement Method)

Hereinafter, a description will be given of various measurement methods for the secondary battery. Specifically, a description will be given of a method of examining the active material contained in an electrode active material-containing layer, and a method of examining the presence of Mn-containing substance(s) at a boundary part between the solid electrolyte layer and the negative electrode active material-containing layer and the Mn abundance ratio on each surface.

First, the battery is brought to a completely discharged state. The completely discharged state as described herein indicates a state in which the battery is discharged at a constant current of 0.2 C or less to the discharge lower limit voltage in an environment of 25° C. The battery brought to the discharged state is placed in a glove box of an inert atmosphere, e.g., a glove box filled with argon gas. Next, in the glove box, an electrode group including a positive electrode, a negative electrode, and an insulating layer is taken out from the battery. Specifically, inside the glove box, the battery is opened by cutting the exterior of the battery while paying attention as a precaution so as to avoid short-circuiting the positive and negative electrodes. The electrode group is taken out therefrom. At this time, it can be determined that an electrode connected to a negative electrode terminal of the battery is the negative electrode while an electrode connected to a positive electrode terminal is the positive electrode.

The electrode group is disassembled to separate the positive electrode, the negative electrode, and the insulating layer. For example, the positive and negative electrodes are each peeled off from the solid electrolyte layer of the insulating layer. At this time, for the negative electrode active material-containing layer of the negative electrode, it is taken note of which surface had been the first surface facing the solid electrolyte layer of the insulating layer. For the solid electrolyte layer of the insulating layer, too, it is taken note of which surface had been the second surface facing the first surface of the negative electrode active material-containing layer. The taken-out electrode is washed with, for example, methyl ethyl carbonate. By this washing, Li salts adhered to the electrode surface are removed, and thereafter, the electrode is dried. The insulating layer is washed and dried in a similar manner.

<Method of Examining Active Material>

Using the active material-containing layer of the electrode obtained by the above-described procedure as a sample, the composition of active material included in the active material-containing layer can be examined by combining elemental analysis with a scanning electron microscope equipped with an energy dispersive X-ray spectrometry scanning apparatus (scanning electron microscope-energy dispersive X-ray spectrometry; SEM-EDX), X-ray diffraction (XRD) measurement, and inductively coupled plasma (ICP) emission spectrometry. By SEM-EDX analysis, shapes of components contained in the active material-containing layer and compositions of the components contained in the active material-containing layer (each element from B to U in the periodic table) can be known. Crystal structures of materials included in the active material-containing layer can be examined by XRD measurement. The elements in the active material-containing layer can be quantified by ICP.

A cross-section of the electrode extracted as described above is cutout by Ar ion milling. The cutout cross-section is observed with the SEM. Sampling is also performed in an inert atmosphere such as argon or nitrogen to avoid exposure to the air. Several particles are selected from SEM images at 3000-fold magnification. Here, particles are selected such that a particle diameter distribution of the selected particles becomes as wide as possible.

Next, elemental analysis is performed on each selected particle by EDX. Accordingly, it is possible to specify kinds and quantities of elements other than Li among the elements contained in each selected particle.

Crystal structure(s) of compound(s) included in each of the particles selected by SEM can be specified by XRD measurement. XRD measurement is performed within a measurement range where $2\theta$ is from 5 degrees to 90 degrees, using CuK$\alpha$ ray as a radiation source. By this measurement, X-ray diffraction patterns of compounds contained in the selected particles can be obtained.

As an apparatus for XRD measurement, SmartLab manufactured by Rigaku is used, for example. Measurement is performed under the following conditions:
 X ray source: Cu target
 Output: 45 kV, 200 mA
 soller slit: 5 degrees in both incident light and received light
  step width ($2\theta$): 0.02 deg
  scan speed: 20 deg/min
  semiconductor detector: D/teX Ultra 250
  sample plate holder: flat glass sample plate holder (0.5 mm thick)
  measurement range: range of $5° \leq 2\theta \leq 90°$ When another apparatus is used, in order to obtain measurement results equivalent to those described above, measurement using a standard Si powder for powder X-ray diffraction is performed, and measurement is conducted with conditions where peak intensities and peak-top positions correspond to those obtained using the above apparatus.

Conditions of the XRD measurement is set, such that an XRD pattern applicable to Rietveld analysis is obtained. In order to collect data for Rietveld analysis, specifically, the step width is made ⅓ to ⅕ of the minimum half width of the diffraction peaks, and the measurement time or X-ray intensity is appropriately adjusted in such a manner that the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, occupancy ratio, or the like) can be precisely analyzed by fitting all the calculated values with the measured values.

Through Rietveld analysis, the content of each active material can be estimated, in a case where plural active materials are included. A fitting parameter S is used as the scale for estimating the degree of agreement between the measured intensities and the calculated intensities in the Rietveld analysis. Analysis must be made in such a manner that the S value turns out less than 1.8. When determining the occupancies in each of the sites, the standard deviation $\sigma j$ must also be taken into consideration. The fitting parameter S and standard deviation $\sigma j$ defined herein are estimated using the formula described in "Funmatsu X sen Kaisetsu no Jissai (Reality of Powder X-Ray Analysis)", 1st edition (2002), X-Ray Analysis Investigation Conversazione, The Japan Society for Analytical Chemistry, written and edited by Izumi Nakai and Fujio Izumi (Asakura Publishing Co., Ltd.).

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position (s) of appearance of the peak(s) derived from the collector is grasped. In addition, the presence/absence of peak(s) of mixed substances such as an electro-conductive agent or a binder is also grasped in advance. If the peak(s) of the current collector overlaps the peak(s) of the active material, it is desirable to perform measurement with the active material-containing layer removed from the current collector. This is in order to separate the overlapping peaks when quantitatively measuring the peak intensities. If the overlapping peaks can be grasped beforehand, the above operations can be omitted, of course.

With regard to Li, information regarding the Li content in the entire active material can be obtained by ICP emission spectrometry. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid. The components included in the active material being measured can be found by subjecting the liquid sample to ICP analysis.

<Examination of Mn-Containing Substance>

The Mn-containing substance present on the first surface of the negative electrode active material-containing layer and the second surface of the solid electrolyte layer, and the abundance ratio of Mn on each surface can be examined through X-ray photoelectron Spectroscopy (XPS) measurement. The XPS measurement can be carried out according to the method described below, for example.

As the apparatus for XPS measurement, for example, Quantera SXM, manufactured by PHI, is used. For the excitation X-ray source, single crystal spectral Al-K$\alpha$ (1486.6 eV) is used, and the photoelectron detection angle is set to 45°.

The dried negative electrode or dried insulating layer taken out as described above is attached to a sample holder for XPS analysis. The sample is introduced in an inert atmosphere, e.g., nitrogen atmosphere. For the negative electrode sample, XPS measurement is performed with respect to the first surface of the negative electrode active material-containing layer taken note of earlier, as a measurement surface. For the insulating layer, XPS measurement is performed with respect to the second surface of the solid electrolyte layer taken note of earlier, as a measurement surface. From the XPS wide scan analysis results for each sample, peak areas are obtained for the elements that are present. The abundance ratio of Mn is calculated from the peak area ratio.

The state of presence of Mn can be investigated through a narrow scan analysis. If an Mn-containing substance such as MnO, MnO$_2$ and MnF$_2$ is present, for example, a peak derived from 2P3/2 and 2P1/2 is observed in the vicinity of 640 eV and 655 eV.

Hereinafter, the negative electrode, the positive electrode, the electrolyte, the insulating layer, the container member, the negative electrode terminal, and the positive electrode terminal will be described in detail.

1) Negative Electrode

The negative electrode includes a negative electrode active material-containing layer. The negative electrode may further include a negative electrode current collector. The negative electrode active material-containing layer may be formed on one surface or both of reverse surfaces of the negative electrode current collector. The negative electrode active material-containing layer includes a negative electrode active material, and may optionally include an electro-conductive agent and a binder.

The negative electrode active material-containing layer may include a carbon material or a metal oxide as the negative electrode active material. A material capable of insertion and extraction of Li ions is used as the negative electrode active material. As negative electrode active material, a carbon material capable of insertion and extraction of Li ions is desirably used.

Examples of the carbon material for the negative electrode active material may include graphite substances such as graphite (e.g., artificial graphite or natural graphite) and carbon materials such as amorphous carbon and crystallized carbon. From the standpoint of increasing an energy density, it is desirable to use graphite as negative electrode active material.

The metal oxide includes, for example, titanium-containing oxides. Examples of titanium-containing oxides include lithium titanate having a ramsdellite structure (e.g., Li$_{2+v}$Ti$_3$O$_7$, 0≤v≤3), lithium titanate having a spinel structure (e.g., Li$_{4+v}$Ti$_5$O$_{12}$, 0≤v≤3), monoclinic titanium dioxide (TiO$_2$), anatase titanium dioxide, rutile titanium dioxide, a hollandite titanium composite oxide, an orthorhombic titanium composite oxide, and monoclinic niobium-titanium composite oxide. Among these titanium-containing oxides, preferable is the lithium titanate having a spinel structure represented by Li$_{4+v}$Ti$_5$O$_{12}$, where 0≤v≤3.

Examples of the orthorhombic titanium-containing composite oxide include a compound represented by Li$_{2+a}$M(I)$_{2-b}$Ti$_{6-c}$M(II)$_d$O$_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: 0≤a≤6, 0≤b<2, 0≤c<6, 0≤d<6, and −0.5≤σ≤0.5. Specific examples of the orthorhombic titanium-containing composite oxide include Li$_{2+a}$Na$_2$Ti$_6$O$_{14}$ (0≤a≤6).

Examples of the monoclinic niobium-titanium composite oxide include a compound represented by Li$_s$Ti$_{1-t}$M1$_t$Nb$_{2-u}$M2$_u$O$_{7+\delta}$. Here, M1 is at least one selected from the group consisting of Zr, Si, and Sn. M2 is at least one selected from the group consisting of V, Ta, and Bi. The respective subscripts in the composition formula are specified as follows: 0≤s≤5, 0≤t<1, 0≤u<2, and −0.3≤δ≤0.3. Specific examples of the monoclinic niobium-titanium composite oxide include Li$_s$Nb$_2$TiO$_7$ (0≤s≤5).

Another example of the monoclinic niobium-titanium composite oxide is a compound represented by Li$_s$Ti$_{1-t}$M3$_{t+u}$Nb$_{2-u}$O$_{7-\delta}$. Here, M3 is at least one selected from the group consisting of Mg, Fe, Ni, Co, W, Ta, and Mo. The respective subscripts in the composition formula are specified as follows: 0≤s<5, 0≤t<1, 0≤u<2, and −0.3≤δ≤0.3.

The electro-conductive agent is added to improve current collection performance and to suppress contact resistance between the active material and the current collector. Examples of the electro-conductive agent include carbonaceous substances such as vapor grown carbon fiber (VGCF), carbon blacks such as acetylene black, graphite, graphene, carbon nanofiber, and carbon nanotubes. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle. The electro-conductive agent may be omitted. For example, the electro-conductive agent may be omitted when using the carbon material as the negative electrode active material.

The binder is added to fill gaps among the dispersed active material and also to bind the active material with the negative electrode current collector. Examples of the binder include polytetrafluoroethylene (PTFE), polyvinylidene fluoride (PVdF), fluorine rubber, styrene-butadiene rubber (SBR), polyacrylate compounds, imide compounds, carboxymethyl cellulose (CMC), and salts of CMC. One of these may be used as the binder, or alternatively, two or more may be used in combination as the binder.

In the negative electrode active material-containing layer using the carbon material as negative electrode active material, the negative electrode active material and binder are preferably blended in proportions of 70% by mass to 98.5% by mass and 1.5% by mass to 30% by mass, respectively. When the amount of binder is 1.5% by mass or more, binding between the active material-containing layer and current collector is sufficient, and excellent cycling performance can be expected. On the other hand, an amount of binder is preferably 30% by mass or less, in view of increasing the capacity.

In the negative electrode active material-containing layer using the titanium-containing oxide as negative electrode active material, the negative electrode active material, electro-conductive agent and binder are preferably blended in proportions of 68% by mass to 97% by mass, 1.5% by mass to 30% by mass, and 1.5% by mass to 30% by mass, respectively. When the amount of electro-conductive agent is 1.5% by mass or more, the current collection performance of the negative electrode active material-containing layer can be improved. When the amount of binder is 1.5% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

The negative electrode active material-containing layer may have a mass per unit area of from 130 g/m$^2$ to 300 g/m$^2$. From the standpoint of increasing energy density, it is desirable to satisfy this range. The negative electrode active material-containing layer using the titanium-containing oxide as the negative electrode active material preferably has a mass per unit area of 150 g/m$^2$ or greater.

The negative electrode active material-containing layer may have a density (not including the current collector) of from 1.3 g/cm$^3$ to 2.8 g/cm$^3$. The negative electrode in which the density of the negative electrode active material-containing layer falls within this range is excellent in energy density and retention of the nonaqueous electrolyte. The negative electrode active material-containing layer using the carbon material as the negative electrode active material preferably has a density of from 1.3 g/cm$^3$ to 1.7 g/cm$^3$. The negative electrode active material-containing layer including the titanium-containing oxide as the negative electrode active material preferably has a density of from 1.8 g/cm$^3$ to 2.8 g/cm$^3$, more preferably from 2.1 g/cm$^3$ to 2.6 g/cm$^3$.

There may be used for the negative electrode current collector, a material which is electrochemically stable at the potential at which lithium (Li) is inserted into and extracted from the negative electrode active material. For example, when the carbon material is used as negative electrode active material, a current collector made of copper, nickel, or stainless steel can be used. When the above titanium-containing oxide is used as negative electrode active material, the negative electrode current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 μm to 20 μm. The negative electrode current collector having such a thickness can maintain balance between the strength and weight reduction of the negative electrode.

The negative electrode current collector may include a portion where the negative electrode active material-containing layer is not formed on a surface thereof. This portion may serve as a negative electrode current collecting tab.

The negative electrode may be produced by the following method, for example. First, negative electrode active material, binder, and optional electro-conductive agent are suspended in a solvent to prepare a slurry. The slurry is applied onto one surface or both of reverse surfaces of a current collector. Next, the applied slurry is dried to form a stack of active material-containing layer(s) and current collector. Then, the stack is subjected to pressing. The negative electrode can be produced in this manner.

Alternatively, the negative electrode may also be produced by the following method. First, negative active material, binder, and optional electro-conductive agent are mixed to obtain a mixture. Next, the mixture is formed into pellets. Then the negative electrode can be obtained by arranging the pellets on the current collector.

2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

The positive electrode active material-containing layer includes a lithium nickel cobalt manganese composite oxide as the positive electrode active material. The positive electrode may contain the lithium nickel cobalt manganese composite oxide alone as the positive electrode active material, or may contain two or more species of the lithium nickel cobalt manganese composite oxide. Furthermore, a mixture obtained by mixing one or two or more species of the lithium nickel cobalt manganese composite oxide with one or two or more species of other positive electrode active material may be included.

Examples of the lithium nickel cobalt manganese composite oxide include a compound represented by $Li_pNi_{1-q-r}Co_qMn_rO_2$ and satisfying 0<p≤1, 0<q<1, 0<r<1, and q+r<1. The lithium nickel cobalt manganese composite oxide as the positive electrode active material more preferably includes a compound having a greater content of Ni, represented by $Li_wNi_{1-x-y}Co_xMn_yO_2$, and satisfying 0<w≤1, 0.05<x<0.25, and 0.05<y<0.2.

As other positive electrode active materials, for example, an oxide or a sulfide may be used. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_pMn_2O_4$ or $Li_pMnO_2$; 0<p≤1), lithium aluminum manganese composite oxide (e.g., $Li_pAl_qMn_{2-q}O_4$; 0<p≤1, 0<q<1), lithium nickel composite oxides (e.g., $Li_pNiO_2$; 0<p≤1), lithium cobalt composite oxides (e.g., $Li_pCoO_2$; 0<p≤1), lithium nickel cobalt composite oxides (e.g., $Li_pNi_{1-q}Co_qO_2$; 0<p≤1, 0<q<1), lithium manganese cobalt composite oxides (e.g., $Li_pMn_qCo_{1-q}O_2$; 0<p≤1, 0<q<1), lithium manganese nickel composite oxides having a spinel structure (e.g., $Li_pMn_{2-h}O_4$; 0<p≤1, 0<h<2), lithium phosphates having an olivine structure (e.g., $Li_pFePO_4$; 0<p≤1, $Li_pMn_{1-q}Fe_qPO_4$; 0<p≤1, 0≤q<1, $Li_pCoPO_4$; 0<p≤1), iron sulfates ($Fe_2(SO_4)_3$), vanadium oxides (e.g., $V_2O_5$), and lithium nickel cobalt aluminum composite oxide (e.g., $LiNi_{1-q-r}Co_qAl_rO_2$; 0<q<1, 0<r<1, q+r<1).

When a room temperature molten salt is used as the nonaqueous electrolyte, it is preferable to use a positive electrode active material including lithium iron phosphate, $Li_bVPO_4F$ (0≤b≤1), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, in-solid diffusion of lithium ions can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, styrene-butadiene rubber (SBR), polyacrylate compounds, imide compounds, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, and graphite. One of these may be used as the electro-conductive agent, or alternatively, two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, decomposition of electrolyte can be reduced during storage under high temperatures.

The positive electrode active material-containing layer may have a mass per unit area of from 200 $g/m^2$ to 500 $g/m^2$. From the standpoint of increasing the energy density, it is desirable to satisfy this range.

The positive electrode active material-containing layer preferably has a density (not including the current collector) of from 3.2 $g/cm^3$ to 3.6 $g/cm^3$. The positive electrode in which the density of the positive electrode active material-containing layer falls within this range is excellent in energy density and retention of the nonaqueous electrolyte.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be produced, for example, by a method similar to that for the negative electrode, using the positive electrode active material in place of the negative electrode active material.

3) Nonaqueous Electrolyte

As the nonaqueous electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), lithium bisfluorosulfonylimide (LiN($SO_2F$)$_2$; LiFSI), lithium bistrifluoromethylsulfonylimide [$LiN(CF_3SO_2)_2$; LiTFSI], and mixtures thereof. The electrolyte salt is preferably resistant to oxidation even at a high potential, and most preferably $LiPF_6$. The effect of being attracted to the solid electrolyte described with reference to FIG. 1 is provided for any anion of these electrolyte salts, but the degree of attraction varies according to anion species. For example, among anions of $LiPF_6$, $LiBF_4$, LiFSI, and LiTFSI, the ease of attraction to the solid electrolyte is in the order of $PF_6^-$, $BF_4^-$, $FSI^-$, and $TFSI^-$ $LiPF_6$ is preferable also because of the tendency for $PF_6^-$ anions to be easily attracted to the solid electrolyte, as such.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent. An organic solvent having polarity is more easily attracted to the solid electrolyte; thus, the organic solvent having polarity is more preferable as solvent of the nonaqueous electrolyte.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions may be used as the nonaqueous electrolyte. The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

4) Insulating Layer

The insulating layer includes a solid electrolyte layer containing a Li ion conductive oxide. The insulating layer may further include a separator substrate.

The solid electrolyte layer and the separator substrate may constitute a composite separator. A composite separator having the solid electrolyte layer provided on at least one surface of the separator substrate may be used as the insulating layer. For example, for a strip-shaped or flat plate-shaped separator substrate having one principal surface and another principal surface on a reverse side thereof, if one principal surface is defined as a third surface while the other surface is defined as a fourth surface, the solid electrolyte layer may be provided on at least one of the third surface or the fourth surface. If the solid electrolyte layer is provided on only one of the third surface or the fourth surface, however, the surface of the obtained solid electrolyte layer is regarded as the second surface, and the composite separator is set inside the battery in such a manner that the second surface faces the first surface of the negative electrode active material-containing layer. It is preferable that the solid electrolyte layer be provided on both the third and fourth surfaces.

If the insulating layer including no separator substrate is used, for example, the solid electrolyte layer may be provided on the positive electrode surface, the negative electrode surface, or both. For example, the solid electrolyte layer may be provided on one surface for each of the positive electrode and the negative electrode, or on both the front and reverse surfaces of each electrode. Alternatively, the entire surface of each electrode may be covered with the solid electrolyte layer. However, for an electrode including an electrode current tab, it is desirable that at least part of the current tab be exposed. The solid electrolyte layer may be directly supported on the surface of the active material-containing layer of at least one of the positive electrode or the negative electrode. Alternatively, the solid electrolyte layer prepared separately may be interposed between the positive and negative electrodes, and used as an insulating layer. It is desirable that the solid electrolyte layer be provided to be at least partly in contact with at least the surface (first surface) of the negative electrode active material-containing layer. It is more preferable that the solid electrolyte layer(s) be directly supported on both the positive and negative electrodes. The solid electrolyte layer formed on the positive electrode and that on the negative electrode may be the same or different solid electrolyte layer(s).

Examples of the Li ion conductive oxide include an oxide compound capable of conducting Li ions such as a compound having a NASICON structure, and a compound having a perovskite structure. Examples of the NASICON structured compound include an LZCP compound represented by $Li_{1+2m}Zr_{2-m}Ca_m(PO_4)_3$ and satisfying $0<m\leq 0.3$; an LATP compound represented by $Li_{1+n}Al_nTi_{2-n}(PO_4)_3$ and satisfying $0<n\leq 0.5$; and an LAGP compound represented by $Li_{1+n}Al_nGe_{2-n}(PO_4)_3$ and satisfying $0<n\leq 0.5$. For the LATP compound, subscript n in the formula is preferably closer to 0.3, and $Li_{1.3}Al_{0.3}Ti_{0.7}(PO_4)_3$ when n=0.3 is most preferable. Examples of the perovskite structure include an LLT compound represented by $Li_{3k}Ln_{2/3-k}TiO_3$ and satisfying $0<k\leq 0.2$ where Ln is at least one selected from the group consisting of La, Pr, Nd and Sm. Other examples include an LLZ compound represented by $Li_{5+j}La_3M_{2-j}Zr_jO_{12}$ and satisfying $0\leq j\leq 2$ where M is at least one selected from the group consisting of Nb and Ta; a LiPON compound represented by $Li_ePO_fN_g$ and satisfying $2.6\leq e\leq 3.5$, $1.9\leq f\leq 3.8$, and $0.1\leq g\leq 1.3$ or a LiPON compound represented by $Li_{3-i}PO_{4-i}N_i$ and satisfying $0.05\leq i\leq 0.5$; $Li_3BO_3$; and $Li_4SiO_4$. For the LLZ compound, subscript j in the formula is preferably closer to 2, and $Li_7La_3Zr_2O_{12}$ when j=2 is most preferable. Among them, one compound may be solely included in the solid electrolyte layer as the solid electrolyte. Alternatively, two or more Li ion conductive oxides may be included in combination in the solid electrolyte layer as the solid electrolyte.

The solid electrolyte layer may further contain a binder in addition to the Li ion conductive oxide. For the binder, it is possible to use a binder similar to the binder that can be included in the positive electrode active material-containing layer or the negative electrode active material-containing layer.

The separator substrate may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

In the composite separator including the solid electrolyte layer and the separator substrate, the solid electrolyte layer may have a thickness of, for example, from 2 μm to 4 μm per side of the separator substrate. If the solid electrolyte layers are provided on both the third and fourth surfaces of the separator substrate, the thickness of the solid electrolyte layer on the third surface may be the same as or different from that on the fourth surface. If no separator substrate is used, the solid electrolyte layer may have a thickness of, for example, from 3 μm to 10 μm. For example, when the solid electrolyte layers are provided on each of the positive electrode surface and the negative electrode surface, the thickness of each respective solid electrolyte layer may be set within this range. The solid electrolyte layer on the positive electrode surface and that on the negative electrode surface may have the same or different thickness.

The separator substrate may have a thickness of from 5 μm to 10 μm. The separator substrate preferably has a thickness of from 5 μm to 9 μm.

The solid electrolyte layer preferably has a void fraction of from 20% to 70%.

The composite separator is obtained by applying a solid electrolyte (Li ion conductive oxide) onto the separator substrate. For example, the composite separator can be obtained by providing the solid electrolyte layer on the separator substrate by the following method. First, a slurry is prepared by suspending solid electrolyte particles and a binder in an appropriate solvent. This slurry is applied onto one or both surfaces of the separator substrate. Next, the applied slurry is dried, thereby obtaining a composite separator in which the solid electrolyte layer and the separator substrate are stacked. In this manner, the composite separator can be prepared.

If a solid electrolyte layer is formed on the active material-containing layer(s) of the positive electrode and/or negative electrode, the slurry similar to that used in the above-described method of preparing the composite separator is applied onto the active material-containing layer, thereby obtaining a solid electrolyte layer. For example, the slurry is applied onto the surface(s) of the active material-containing layer(s) on one or both surfaces of the electrode, and the slurry is dried, thereby obtaining a stack of the active material-containing layer and the solid electrolyte layer.

When the slurry of the solid electrolyte is applied onto the separator substrate or the active material-containing layer, a coating device having a gravure coating function may be used. On the target application surface (surface of the separator substrate or the active material-containing layer), a desired solid electrolyte layer can be provided by a gravure coater. A die coater may be used instead of the gravure coater. Even when the die coater is used, the solid electrolyte layer having a thickness of few μm can be applied onto the separator substrate or the electrode active material-containing layer.

5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylindrical, coin-shaped, or button-shaped. The container member may be appropriately selected depending on battery size and use of the battery.

6) Negative Electrode Terminal

The negative electrode terminal may be made of a material that is electrochemically stable at the Li insertion/extraction potential of the aforementioned negative electrode active material, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. When the carbon material is used as negative electrode active material, copper, nickel, or stainless steel is used as the material for the negative electrode terminal. When the above-descried titanium-containing oxide is used as negative electrode active material, aluminum or aluminum alloy is preferably used as the material for the negative electrode terminal. The negative electrode terminal is preferably made of the same material as the negative electrode current collector, in order to reduce contact resistance between the negative electrode terminal and the negative electrode current collector.

7) Positive Electrode Terminal

The positive electrode terminal may be made of a material that is electrically stable in the potential range of 3 V to 4.5 V (vs. Li/Li$^+$) relative to the redox potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the embodiment will be more concretely described with reference to the drawings.

Figure 2:
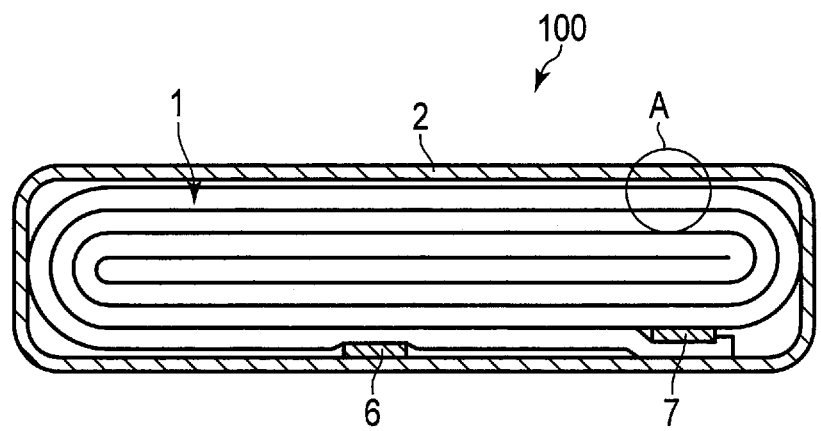
FIG. 2 is a cross-sectional view schematically showing an example of a secondary battery according to an embodiment.
Figure 3:
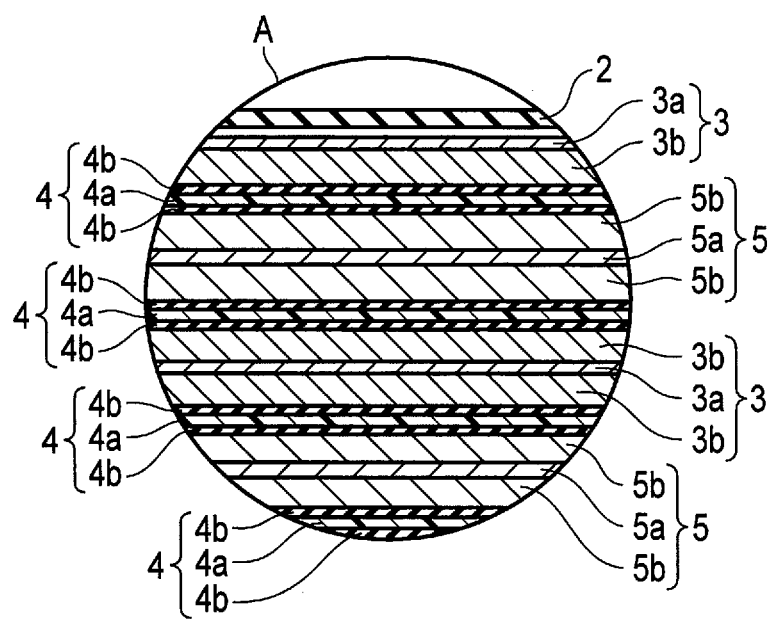
FIG. 3 is an enlarged cross-sectional view of section A of the secondary battery shown in FIG. 2.

FIG. 2 is a cross-sectional view schematically showing an example of a secondary battery according to the embodiment. FIG. 3 is an enlarged cross-sectional view of section A of the secondary battery shown in FIG. 2.

The secondary battery 100 shown in FIGS. 2 and 3 includes a bag-shaped container member 2 shown in FIG. 2, an electrode group 1 shown in FIGS. 2 and 3, and a nonaqueous electrolyte in liquid or gel form, which is not shown. The electrode group 1 and nonaqueous electrolyte are housed in the bag-shaped container member 2. The nonaqueous electrolyte (not shown) is held in the electrode group 1.

The bag-shaped container member 2 is made of a laminate film including two resin layers and a metal layer sandwiched between the resin layers.

As shown in FIG. 2, the electrode group 1 is a wound electrode group in a flat form. The wound electrode group 1 in a flat form includes a negative electrode 3, a composite separator 4, and a positive electrode 5, as shown in FIG. 3. The composite separator 4 is sandwiched between the negative electrode 3 and the positive electrode 5. The composite separator 4 includes two solid electrolyte layers 4b and a separator substrate 4a sandwiched therebetween.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 3. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 2, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 4:
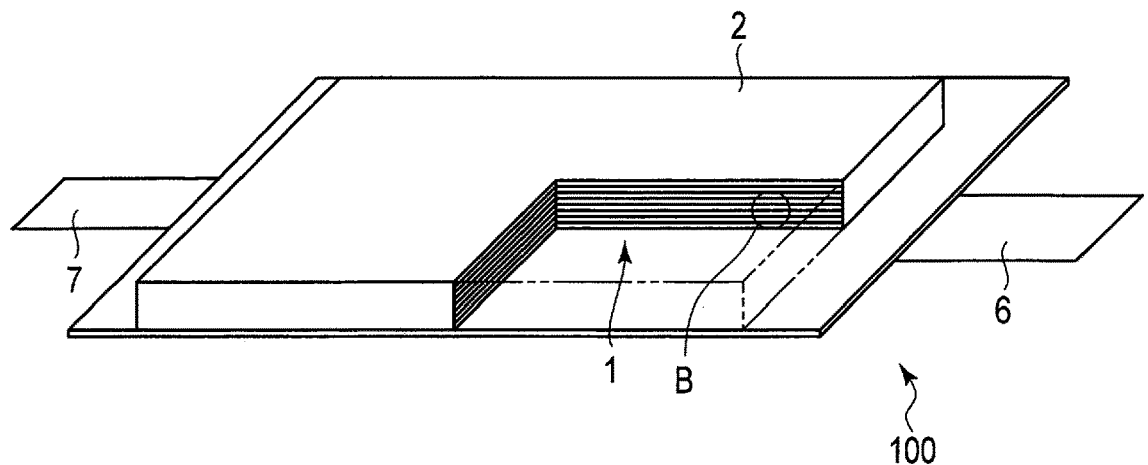
FIG. 4 is a partially cut-out perspective view schematically showing another example of the secondary battery according to the embodiment.
Figure 5:
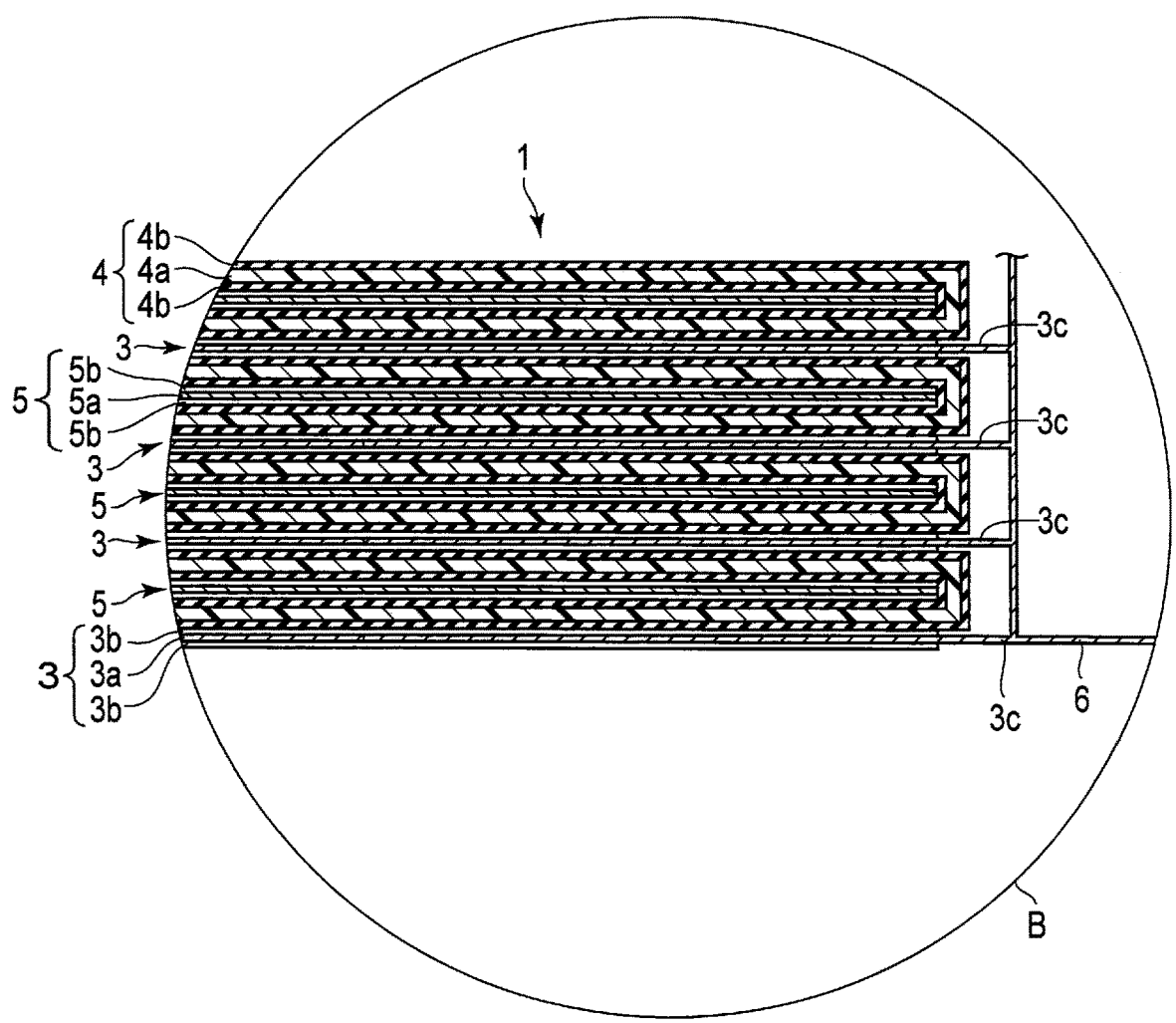
FIG. 5 is an enlarged cross-sectional view of section B of the secondary battery shown in FIG. 4.
Figure 6:
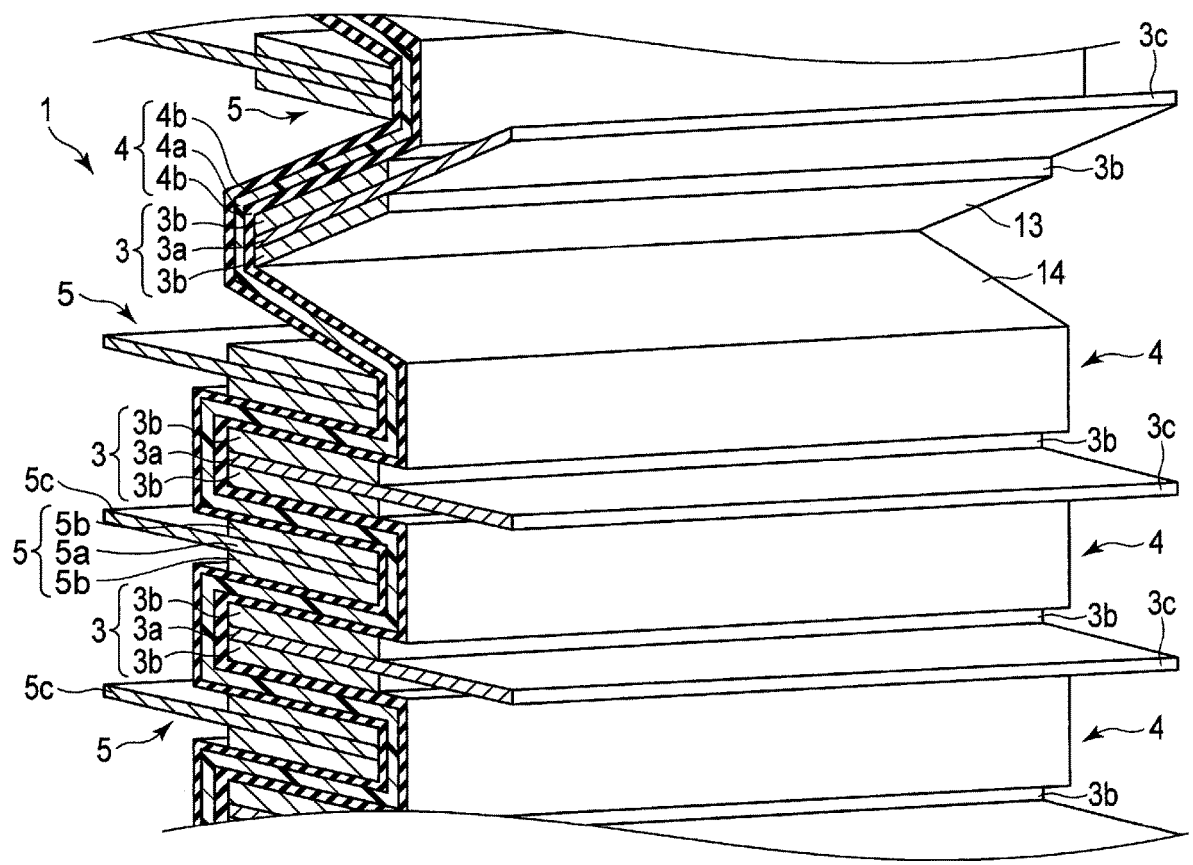
FIG. 6 is a partially unfolded cross-sectional perspective view schematically showing an electrode group included in the secondary battery shown in FIG. 4.

The secondary battery according to the embodiment is not limited to the secondary battery of the structure shown in FIGS. 2 and 3, and may be, for example, a battery of a structure shown in FIGS. 4 to 6.

FIG. 4 is a partially cutout perspective view schematically showing another example of the secondary battery according to the embodiment. FIG. 5 is an enlarged cross-sectional view of section B of the secondary battery shown in FIG. 4. FIG. 6 is a partially unfolded cross-sectional perspective view schematically showing an electrode group included in the secondary battery shown in FIG. 4.

The secondary battery 100 shown in FIGS. 4 and 5 includes an electrode group 1 shown in FIGS. 4 to 6, a container member 2 shown in FIG. 4, and a nonaqueous electrolyte of liquid or gel form, which is not shown. The electrode group 1 and nonaqueous electrolyte are housed in the container member 2. The nonaqueous electrolyte is held in the electrode group 1.

The container member 2 is made of a laminate film including two resin layers and a metal layer sandwiched between the resin layers.

As shown in FIGS. 5 and 6, the electrode group 1 is a stacked electrode group. The stacked electrode group 1 has a structure in which negative electrodes 3 and positive electrodes 5 are alternately stacked with a composite separator 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion where the negative electrode active material-containing layer 3b is not supported on either surface. This portion serves as a negative electrode tab 3c. As shown in FIGS. 5 and 6, the negative electrode tabs 3c do not overlap the positive electrodes 5. As shown in FIG. 5, the plural negative electrode tabs 3c are electrically connected to the strip-shaped negative electrode terminal 6. Note, that in FIG. 6, the negative electrode terminal 6 is omitted, for the purpose of simplifying the drawing. A tip of the strip-shaped negative electrode terminal 6 is drawn to the outside from the container member 2.

As shown in FIG. 6, the positive electrode current collector 5a of each of the positive electrodes 5 includes at one end, a portion where the positive electrode active material-containing layer 5b is not supported on either surface. This portion serves as a positive electrode tab 5c. Like the negative electrode tabs 3c, the positive electrode tabs do not overlap the negative electrodes 3. Further, the positive electrode tabs 5c are located on the opposite side of the electrode group 1 with respect to the negative electrode tabs 3c. Although not shown, the positive electrode tabs 5c are electrically connected to the strip-shaped positive electrode terminal 7. A tip of the strip-shaped positive electrode terminal 7 is located on the opposite side relative to the negative electrode terminal 6 and drawn to the outside from the container member 2.

The composite separator 4 includes a separator substrate 4a, and solid electrolyte layers 4b provided on both surfaces of the separator substrate 4a. In the illustrated example, a single composite separator 4 folded in a zigzag pattern is used as the insulating layer. The negative electrodes 3 and positive electrodes 5 are alternately arranged in spaces created by folding back the composite separator 4 so that the surfaces of the solid electrolyte layers 4b face each other. In the electrode group 1, a first surface 13 of the negative electrode active material-containing layer 3b and a part of a second surface 14 of the solid electrolyte layer 4b are faced opposed to each other. The first surface 13 and the second surface 14 may be at least partly in contact with each other. Similarly, the surface of the positive electrode active material-containing layer 5b is faced opposed to a part of a surface of the other solid electrolyte layer 4b on the reverse side of the composite separator 4 with respect to the second surface 14 of the solid electrolyte layer 4b. These surfaces may be at least partly in contact with each other.

In the electrode group 1 illustrated in FIGS. 5 and 6, the composite separator 4 is folded in a zigzag manner, but the form of the composite separator 4 is not limited to this example. For example, plural composite separators 4 may be arranged between the positive electrode 3 and the negative electrode 5 arranged alternately.

In a secondary battery of any structure, the separator substrate 4a may be omitted. In this case, instead of the composite separator 4, a single solid electrolyte layer 4b may be used as the insulating layer. Alternatively, instead of the composite separator 4, plural solid electrolyte layers 4b may be stacked for use as an insulating layer.

According to the first embodiment, provided is a secondary battery including a positive electrode, a negative electrode, an insulating layer, and a nonaqueous electrolyte. The positive electrode is provided with a positive electrode active material-containing layer. The positive electrode active material-containing layer includes a lithium nickel cobalt manganese composite oxide. The negative electrode is provided with a negative electrode active material-containing layer having a first surface. The insulating layer includes a solid electrolyte layer having a second surface. The second surface of the solid electrolyte layer at least partially faces opposite to or partially contacts the first surface. The solid electrolyte layer contains a Li ion conductive oxide. A Mn-containing substance is present on at least part of the second surface of the solid electrolyte layer. Alternatively, the Mn-containing substance is present on at least a part on each of the second surface and the first surface of the negative electrode active material-containing layer. An abundance ratio of Mn on the second surface is greater than an abundance ratio of Mn on the first surface. The secondary battery can exhibit excellent cycle life performance.

Second Embodiment

According to a second embodiment, a battery module is provided. The battery module according to the second embodiment includes plural of secondary batteries according to the first embodiment.

In the battery module according to the second embodiment, each of the single-batteries may be arranged to be electrically connected in series or in parallel, or may be arranged in combination of in-series connection and in-parallel connection.

An example of the battery module according to the second embodiment will be described next, with reference to the drawings.

Figure 7:
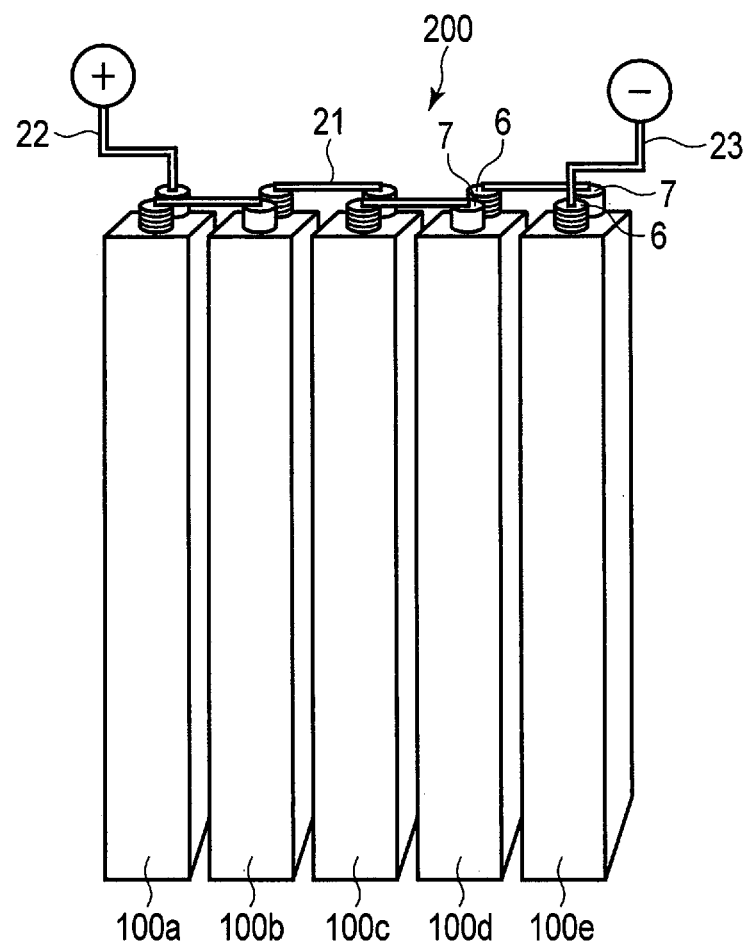
FIG. 7 is a perspective view schematically showing an example of a battery module according to an embodiment.

FIG. 7 is a perspective view schematically showing an example of the battery module according to the second embodiment. The battery module 200 shown in FIG. 7 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 7 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the second embodiment includes the secondary battery according to the first embodiment. Therefore, the battery module is excellent in life performance.

Third Embodiment

According to a third embodiment, a battery pack is provided. The battery pack includes a battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the third embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the third embodiment will be described with reference to the drawings.

Figure 8:
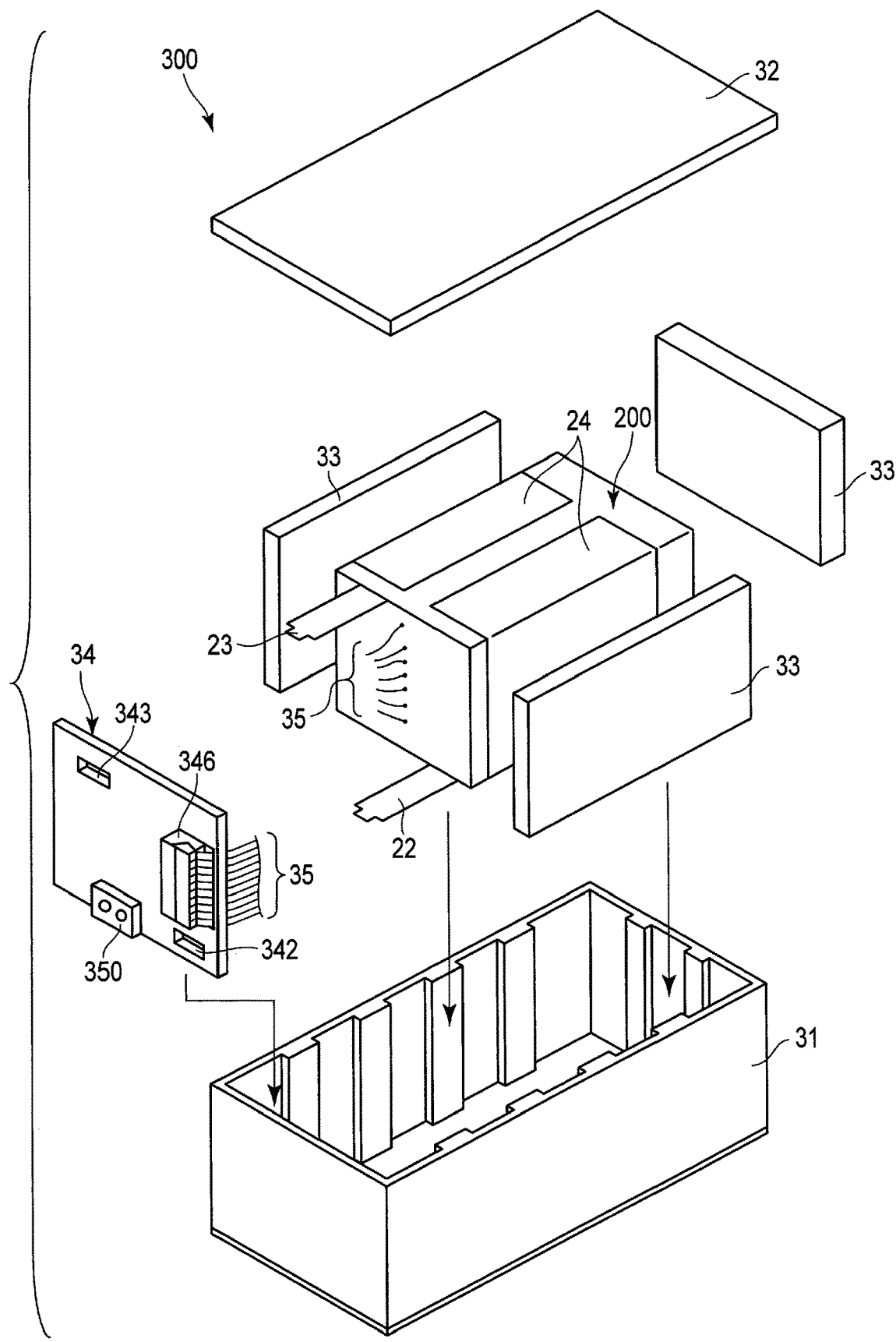
FIG. 8 is an exploded perspective view schematically showing an example of a battery pack according to an embodiment.

FIG. 8 is an exploded perspective view schematically showing an example of the battery pack according to the third embodiment. FIG. 9 is a block diagram showing an example of an electric circuit of the battery pack shown in FIG. 8.

A battery pack 300 shown in FIGS. 8 and 9 includes a housing container 31, a lid 32, protective sheets 33, a battery module 200, a printed wiring board 34, wires 35, and an insulating plate (not shown).

The housing container 31 shown in FIG. 8 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces one side surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cutoff electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of over-charge, over-discharge, and overcurrent of the single-battery(s) 100. When detecting over charge or the like for each of the single batteries 100, the battery voltage may be detected, or a positive electrode potential or negative electrode potential may be detected. In the latter case, a lithium electrode to be used as a reference electrode is inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of the vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment is provided with the secondary battery according to the first embodiment or the battery module according to the second embodiment. Accordingly, the battery pack is excellent in life performance.

Fourth Embodiment

According to a fourth embodiment, a vehicle is provided. The battery pack according to the third embodiment is installed on this vehicle.

In the vehicle according to the fourth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fourth embodiment include two-wheeled to four-wheeled hybrid electric automobiles, two-wheeled to four-wheeled electric automobiles, electrically assisted bicycles, and railway cars.

In the vehicle according to the fourth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fourth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fourth embodiment is explained below, with reference to the drawings.

FIG. 10 is a partially see-through diagram schematically showing an example of a vehicle according to the fourth embodiment.

A vehicle 400, shown in FIG. 10 includes a vehicle body 40 and a battery pack 300 according to the third embodiment. In the example shown in FIG. 10, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 10, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 11:
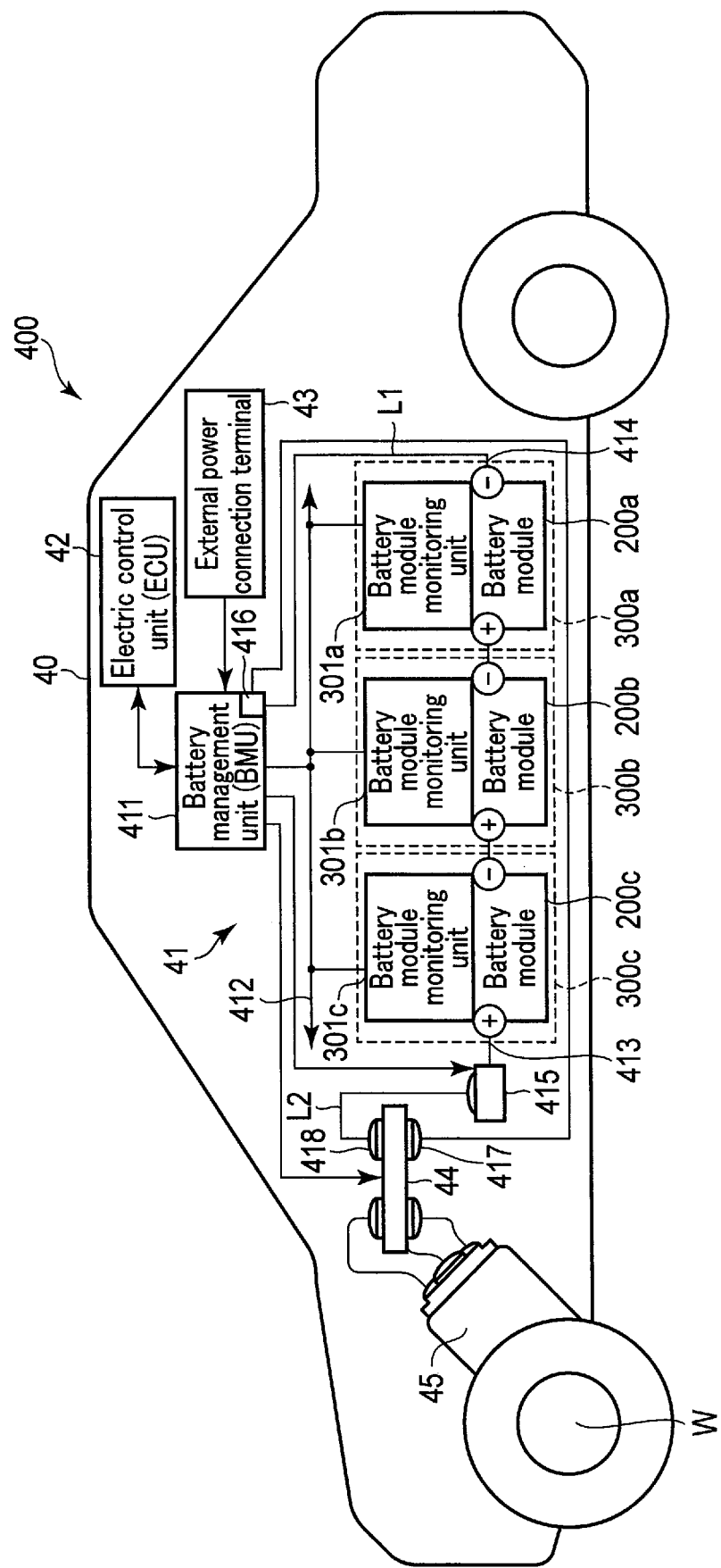
FIG. 11 is a diagram schematically showing an example of a control system related to an electric system in the vehicle according to the embodiment.

Next, with reference to FIG. 11, an aspect of operation of the vehicle according to the fourth embodiment is explained.

FIG. 11 is a diagram schematically showing an example of a control system related to an electric system in the vehicle according to the fourth embodiment. A vehicle 400, shown in FIG. 11, is an electric automobile.

The vehicle 400, shown in FIG. 11, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 11, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the first embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In the communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 11) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism, though not shown. The regenerative brake mechanism (e.g., a regenerator) rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fourth embodiment is installed with the battery pack according to the third embodiment. Thus, by virtue of being provided with the battery pack excellent in life performance, the vehicle is high in reliability.

EXAMPLES

Examples will be described hereinafter, but the embodiments of the present invention are not limited to the examples listed below, so long as the embodiments do not depart from the spirit of the invention.

Example 1

[Production of Positive Electrode]

As positive electrode active material, prepared was a powder of lithium nickel cobalt manganese composite oxide having a composition represented by $LiNi_{0.8}Co_{0.1}Mn_{0.1}O_2$.

The lithium nickel cobalt manganese composite oxide powder, acetylene black as electro-conductive agent and polyvinylidene fluoride (PVdF) as binder were added at a mixing ratio of 95 parts by mass:3 parts by mass:2 parts by mass into N-methylpyrrolidone (NMP) as a solvent, and mixed. Next, the resulting mixture was dispersed using a planetary centrifugal mixer to prepare a slurry.

Next, the prepared slurry was applied onto both surfaces of a current collector made of aluminum foil having a thickness of 15 μm. An amount of application per face of the current collector was 250 g/m². Next, the applied coat was dried and pressed, thereby producing a positive electrode provided with a positive electrode active material-containing layer with a density of 3.3 g/cm³.

[Production of Negative Electrode]

Graphite was prepared as an active material. Carboxymethyl cellulose (CMC) and styrene-butadiene rubber (SBR) were prepared as binder. The graphite, CMC, and SER were added at a mixing ratio of 97 parts by mass:1.5 parts by mass:1.5 parts by mass into pure water as solvent, and mixed. Subsequently, the resulting mixture was dispersed using a planetary centrifugal mixer to yield a slurry.

Next, the prepared slurry was applied onto both of reverse faces of a current collector made of copper foil having a thickness of 12 μm. An amount of application was 150 g/m² per face of the current collector. Then, the applied coat was dried, and pressing was performed, thereby producing a negative electrode provided with a negative electrode active material-containing layer having a density of 1.6 g/cm².

[Production of Electrode Group]

As insulating layer, a composite separator was prepared in the following manner. LZCP solid electrolyte particles represented by $Li_{1.2}Zr_{1.9}Ca_{0.1}(PO_4)_3$, CMC, and SBR were prepared. The solid electrolyte particles, CMC, and SBR were added into pure water as solvent and mixed at a mixing ratio of 98 parts by mass:1 part by mass:1 part by mass, thereby obtaining a slurry. The resulting slurry was applied by a gravure coater onto both the front and reverse surfaces of a separator substrate made of a polyethylene (PE) porous film having a thickness of 10 μm, and dried, and 2 μm of solid electrolyte layer was formed on each surface, thereby obtaining a composite separator. The void fraction of the LZCP-applied layer was adjusted to 40%.

Next, plural positive electrode pieces were punched out from the above positive electrode, each having dimensions of 50 mm length and 50 mm width. In a similar manner, plural negative electrode pieces were punched out from the above negative electrode, each having dimensions of 50 mm length and 50 mm width. The plural positive electrode pieces, the plural negative electrode pieces, and the composite separator prepared as described above were stacked in such a manner that the composite separator was folded in a zigzag pattern, and these components were arranged in an order where the composite separator is placed on a negative electrode piece, a positive electrode piece is placed thereon, and the composite separator is further placed thereon. In this manner, the electrode stack was obtained. Next, the electrode stack was subjected to hot pressing at 80° C.

Thus, a flat electrode group having a width of 50 mm, a height of 50 mm, and a thickness of 2.3 mm was prepared.

The current collector of each positive electrode piece included in the obtained electrode group was electrically connected, and a positive electrode terminal made of aluminum was welded thereto. The current collector of each negative electrode piece was electrically connected, and a negative electrode terminal made of aluminum was welded thereto.

[Housing and Drying of Electrode Group]

A container member made of laminate film was prepared. The laminate film included an aluminum foil having a thickness of 40 μm and a polypropylene layer formed on both surfaces of the aluminum foil. A total thickness of the laminate film was 0.1 mm.

Next, the electrode group was housed in the container member with a part of the positive electrode terminal and a part of the negative electrode terminal placed outside. Next, the periphery of the container was heat-sealed, leaving apart unsealed. In this state, the electrode group was subjected to vacuum drying at 80° C. for 24 hours.

[Preparation of Liquid Nonaqueous Electrolyte]

Ethylene carbonate (EC) and diethyl carbonate (DEC) were mixed at amass ratio of 1:1 to obtain a mixed solvent. $LiPF_6$ as an electrolyte salt was dissolved in this mixed solvent at a concentration of 1 M, and thus, a liquid nonaqueous electrolyte was prepared.

[Assembly of Nonaqueous Electrolyte Battery]

The liquid nonaqueous electrolyte was put into the container housing the electrode group as described above. Thereafter, a temporary seal was applied to the periphery of the container member that had not been heat-sealed, and the electrode group and the nonaqueous electrolyte were sealed within the container member.

[Formation of Mn-Containing Substance]

The assembled battery was placed into a thermostatic bath set to a bath temperature of 25° C. In the thermostatic bath, the battery was charged at a constant current of 0.1 C up to a battery voltage of 4.3 V, and after reaching the battery voltage of 4.3 V, charged at a constant voltage for 2 hours. The charged battery was moved into a thermostatic bath set to 45° C., and stored for 5 hours. After this first storing treatment was performed, the battery was moved into a thermostatic bath set to 25° C. In the thermostatic bath, the battery was discharged at a constant current of 0.1 C to a battery voltage of 2.5 V, and held in an open circuit state for 30 minutes. Thereafter, the battery was charged at a constant current of 0.1 C up to 3.6 V. The charge capacity at this time was 0.5 Ah. The recharged battery was moved into a thermostatic bath set to 45° C., and stored for 12 hours.

After this second storing treatment, the battery was taken out from the thermostatic bath, and depressurizing sealing was performed in an argon atmosphere glove box to thereby remove gas present within the battery. Thereafter, the part of the periphery of the container member that had not been heat-sealed was heat-sealed, and the members in the battery were completely sealed in. In this manner, a nonaqueous electrolyte battery was obtained.

Thereafter, the capacity of the nonaqueous electrolyte battery was confirmed as follows. In the thermostatic bath set to 25° C., the battery was charged at a constant current of 0.1 C up to a battery voltage of 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery obtained at this time was 1 Ah. Therefore, assuming that the state of charge (SOC) during the first storing treatment was 100%, the SOC during the second storing treatment was 50%.

Example 2

A positive electrode was produced in a similar manner as in Example 1 except that the positive electrode active material was changed to a powder of lithium nickel cobalt manganese composite oxide having a composition represented by a formula $LiNi_{0.6}Co_{0.2}Mn_{0.2}O_2$, and the amount of application of the slurry onto the current collector was changed to 200 g/m² per face. A negative electrode was produced in a similar manner as in Example 1 except that the amount of application of the slurry onto the current collector was changed to 110 g/m² per face. A battery was produced in a similar manner as in Example 1 except that these positive and negative electrodes were used.

Example 3

A positive electrode was produced in a similar manner as in Example 1 except that the positive electrode active material was changed to a powder of lithium nickel cobalt manganese composite oxide having a composition represented by a formula $LiNi_{0.5}Co_{0.2}Mn_{0.3}O_2$, and the amount of application of the slurry onto the current collector was changed to 200 g/m² per face. A negative electrode was produced in a similar manner as in Example 1 except that the amount of application of the slurry onto the current collector was changed to 105 g/m² per face. A battery was produced in a similar manner as in Example 1 except that these positive and negative electrodes were used.

Example 4

A battery was produced in a similar manner as in Example 3 except that the treatment conditions of producing the negative electrode and forming the Mn-containing substance were changed as follows.

[Production of Negative Electrode]

$Li_4Ti_5O_{12}$ was prepared as negative electrode active material. Carbon black as electro-conductive agent and polyvinylidene fluoride (PVdF) as binder were prepared. The $Li_4Ti_5O_{12}$, carbon black, and PVdF were added at a mixing ratio of 97 parts by mass:1.5 parts by mass:1.5 parts by mass into NMP as solvent, and mixed. Subsequently, the resulting mixture was dispersed using a planetary centrifugal mixer to yield a slurry.

Next, the prepared slurry was applied onto both faces of a current collector made of aluminum foil having a thickness of 12 μm. An amount of application was 200 g/m² per face of the current collector. Then, the applied coat was dried, and pressing was performed, thereby producing a negative electrode provided with a negative electrode active material-containing layer having a density of 2.3 g/cm³.

In addition, the negative electrode terminal welded onto the negative electrode current collector was changed to one made of aluminum.

[Formation of Mn-Containing Substance]

The assembled battery was placed into a thermostatic bath set to a bath temperature of 25° C. In the thermostatic bath, the battery was charged at a constant current of 0.1 C up to 2.7 V, and after reaching 2.7 V, charged at constant voltage for 2 hours. The charged battery was moved into a thermostatic bath set to 45° C., and stored for 5 hours. After this first storing treatment was performed, the battery was moved into a thermostatic bath set to 25° C., and discharged at a constant current of 0.1 C to a battery voltage of 1.5 V, then held in an open circuit state for 30 minutes. Thereafter, the battery was charged at a constant current of 0.1 C up to 2.3 V. The charge capacity at this time was 0.5 Ah. The battery was moved into a thermostatic bath set to 45° C., and stored for 12 hours.

The battery was taken out after the second storing treatment, and depressurizing sealing was performed in a glove box of an argon atmosphere to remove gas present within the battery. Subsequently, the members in the battery were completely sealed in. In this manner, a nonaqueous electrolyte battery was obtained.

Thereafter, examination of the capacity of the nonaqueous electrolyte battery was performed. In the thermostatic bath set to 25° C., the battery was charged at a constant current of 0.1 C up to 2.7 V, and after reaching 2.7 V, charged at a constant voltage for 2 hours. Next, after holding the battery in an open circuit state for 30 minutes, the battery was discharged at a constant current of 0.1 C to 1.5 V. The discharge capacity of the nonaqueous electrolyte battery obtained at this time was 1 Ah. Therefore, assuming that the state of charge (SOC) during the first storing treatment was 100%, the SOC during the second storing treatment was 50%.

Example 5

When the composite separator as insulating layer was produced, a solid electrolyte layer having a thickness of 3 μm and containing LZCP was formed only on one surface of the separator substrate made of the polyethylene porous film having a thickness of 10 μm. Furthermore, when the positive electrode pieces, the negative electrode pieces and the composite separator were stacked, adopted was an arrangement where the face of the composite separator on the LZCP electrolyte layer side was in contact with the negative electrode. A battery was produced in a similar manner as in Example 1 except for these changes.

Example 6

A battery was produced in a similar manner as in Example 1 except that the treatment conditions for forming the Mn-containing substance were changed as follows.

[Formation of Mn-Containing Substance]

The assembled battery was placed into a thermostatic bath set to a bath temperature of 25° C. and charged at a constant current of 0.1 C up to 4.3 V in the thermostatic bath, and after reaching 4.3 V, charged at constant voltage for 2 hours. The battery was moved into a thermostatic bath set to 60° C., and stored for 3 hours. After this first storing treatment, in a thermostatic bath set to 25° C., the battery was discharged at a constant current of 0.1 C to 2.5 V, and held in an open circuit state for 30 minutes. Thereafter, the battery was charged at a constant current of 0.1 C such that the state of charge (SOC) was 34%. The charge capacity at this time was 0.34 Ah. The battery was moved into a thermostatic bath set to 45° C., and stored for 12 hours.

The battery was taken out after this second storing treatment, and depressurizing sealing was performed in an argon atmosphere glove box to remove gas present within the battery. Subsequently, the members in the battery were completely sealed in to thus obtain a nonaqueous electrolyte battery.

Thereafter, capacity examination for the nonaqueous electrolyte battery was performed. In the thermostatic bath set to 25° C., the battery was charged at a constant current of 0.1 C up to 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery obtained at this time was 1 Ah.

Example 7

A battery was produced in a similar manner as in Example 1 except that the treatment conditions for forming the Mn-containing substance were changed as follows.

[Formation of Mn-Containing Substance]

The assembled battery was placed into a thermostatic bath set to a bath temperature of 25° C. and charged at a constant current of 0.1 C up to 4.3 V in the thermostatic bath, and after reaching 4.3 V, charged at constant voltage for 2 hours. The battery was moved into a thermostatic bath set to 25° C., and stored for 48 hours. After such a first storing treatment, in a thermostatic bath set to 25° C., the battery was discharged at a constant current of 0.1 C to a battery voltage of 2.5 V, and held in an open circuit state for 30 minutes. Thereafter, the battery was charged at a constant current such that the state of charge (SOC) was 34%. The charge capacity at this time was 0.34 Ah. The battery was moved into a thermostatic bath set to 45° C., and stored for 12 hours.

The battery was taken out after the second storing treatment, and depressurizing sealing was performed in an argon atmosphere glove box to remove gas present within the battery. Thereby, a nonaqueous electrolyte battery was obtained.

Thereafter, capacity examination for the nonaqueous electrolyte battery was performed. In the thermostatic bath set to 25° C., the battery was charged at a constant current of 0.1 C up to 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery obtained at this time was 1 Ah.

Example 8

A battery was produced in a similar manner as in Example 1 except that the treatment conditions for forming the Mn-containing substance were changed as follows.

[Formation of Mn-Containing Substance]

The assembled battery was charged at a constant current of 0.1 C up to 90% state of charge (SOC) in a thermostatic bath set to a bath temperature of 25° C. The battery was moved into a thermostatic bath set to 45° C., and stored for 12 hours. After that, in a thermostatic bath set to 25° C., the battery was discharged at a constant current of 0.1 C to a battery voltage of 2.5 V, and held in an open circuit state for 30 minutes. After such a first storing treatment, the battery was charged at a constant current of 0.1 C such that the state of charge was 50%. The charge capacity was 0.5 Ah. The battery was moved into the thermostatic bath set to 45° C., and stored for 12 hours.

The battery was taken out after the second storing treatment, and depressurizing sealing was performed in an argon atmosphere glove box to remove gas present within the battery. The members in the battery were completely sealed in to thus obtain a nonaqueous electrolyte battery.

Thereafter, capacity examination for the nonaqueous electrolyte battery was performed. In the thermostatic bath set to 25° C., the battery was charged at a constant current of 0.1 C up to 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery was 1 Ah.

Example 9

A battery was produced in a similar manner as in Example 1 except that the treatment conditions for forming the Mn-containing substance were changed as follows.

[Formation of Mn-Containing Substance]

The assembled battery was charged at a constant current of 0.1 C up to 4.3 V in a thermostatic bath set to a bath temperature of 25° C., and after reaching 4.3 V, charged at constant voltage for 2 hours. The battery was moved into a thermostatic bath set to 45° C., and stored for 5 hours. Thereafter, in a thermostatic bath set to 25° C., the battery was discharged at a constant current of 0.1 C to 2.5 V, and held in an open circuit state for 30 minutes. After such a first storing treatment, the battery was charged at a constant current of 0.1 C such that the state of charge (SOC) was 50%. The charge capacity was 0.5 Ah. The battery was moved into a thermostatic bath set to 60° C., and stored for 10 hours.

The battery was taken out after the second storing treatment, and depressurizing sealing was performed in an argon atmosphere glove box to remove gas present within the battery. The members in the battery were completely sealed in to thus obtain a nonaqueous electrolyte battery.

Thereafter, capacity examination for the nonaqueous electrolyte battery was performed. In the thermostatic bath set to 25° C., the battery was charged at a constant current of 0.1 C up to 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery was 1 Ah.

Example 10

A battery was produced in a similar manner as in Example 1 except that the treatment conditions for forming the Mn-containing substance were changed as follows.

[Formation of Mn-Containing Substance]

The assembled battery was charged at a constant current of 0.1 C up to 4.3 V in a thermostatic bath set to a bath temperature of 25° C., and after reaching 4.3 V, charged at constant voltage for 2 hours. The battery was moved into a thermostatic bath set to 45° C., and stored for 5 hours. Thereafter, in a thermostatic bath set to 25° C., the battery was discharged at a constant current of 0.1 C to 2.5 V, and held in an open circuit state for 30 minutes. After such a first storing treatment, the battery was charged at a constant current of 0.1 C such that the state of charge (SOC) was 80%. The charge capacity was 0.8 Ah. The battery was moved into a thermostatic bath set to 30° C., and stored for 15 hours.

The battery was taken out from the thermostatic bath after the second storing treatment, and depressurizing sealing was performed in an argon atmosphere glove box to remove gas present within the battery. The members in the battery were completely sealed in to thus obtain a nonaqueous electrolyte battery.

Thereafter, capacity examination for the nonaqueous electrolyte battery was performed. In the thermostatic bath set to 25° C., the battery was charged at a constant current of 0.1 C up to 4.3 V, and after reaching 4.3 V, charged at a constant voltage for 2 hours. Next, after holding the battery in an open circuit state for 30 minutes, the battery was discharged at a constant current of 0.1 C to 2.5 V. The discharge capacity of the nonaqueous electrolyte battery was 1 Ah.

Example 11

A positive electrode was produced in a similar manner as in Example 1 except that the positive electrode active material was changed to one same as that in Example 3, and the amount of application of the slurry onto the current collector was changed to 100 g/m² per face. A negative electrode was produced in a similar manner as in Example 1 except that the amount of application of the slurry onto the current collector was changed to 52.5 g/m² per face. A battery was produced in a similar manner as in Example 1 except that these positive and negative electrodes were used.

Example 12

A positive electrode was produced in a similar manner as in Example 1 except that the positive electrode active material was changed to one same as that in Example 4, and the amount of application of the slurry onto the current collector was changed to 100 g/m² per face. A negative electrode was produced in a similar manner as in Example 1 except that the negative electrode active material was changed to one same as that in Example 4, and the amount of application of the slurry onto the current collector was changed to 100 g/m² per face. A battery was produced in a similar manner as in Example 1 except that these positive and negative electrodes were used.

Example 13

A battery was produced in a similar manner as in Example 1 except that when the composite separator as insulating layer was produced, the solid electrolyte particles applied onto the polyethylene separator substrate were changed to LATP represented by $Li_{1.3}Al_{0.3}Ti_{1.7}(PO_4)_3$.

Example 14

A battery was produced in a similar manner as in Example 1 except that when the composite separator as insulating layer was produced, the solid electrolyte particles applied onto the polyethylene separator substrate were changed to LAGP represented by $Li_{1.5}Al_{0.5}Ge_{1.5}(PO_4)_3$.

Example 15

A battery was produced in a similar manner as in Example 1 except that when the composite separator as insulating layer was produced, the solid electrolyte particles applied onto the polyethylene separator substrate were changed to LLZ represented by $Li_7La_3Zr_2O_{12}$.

Example 16

A battery was produced in a similar manner as in Example 1 except that when the composite separator as insulating layer was produced, the solid electrolyte particles applied onto the polyethylene separator substrate were changed to LLT represented by $Li_{0.35}La_{0.55}TiO_3$.

Example 17

A battery was produced in a similar manner as in Example 1 except that when the composite separator as insulating layer was produced, LZCP was applied onto a cellulose separator substrate having a thickness of 10 μm, and not the polyethylene separator substrate.

Example 18

A battery was produced in a similar manner as in Example 1 except that the conditions of manufacturing the electrode group were changed as follows.

[Production of Positive Electrode]

As positive electrode active material, prepared was a powder of lithium nickel cobalt manganese composite oxide having a composition represented by $LiNi_{0.5}Co_{0.2}Mn_{0.3}O_2$.

The lithium nickel cobalt manganese composite oxide powder, acetylene black as electro-conductive agent and polyvinylidene fluoride (PVdF) as binder were added at a mixing ratio of 95 parts by mass:3 parts by mass:2 parts by mass into N-methylpyrrolidone (NMP) as a solvent, and mixed. Then, the resulting mixture was dispersed using a planetary centrifugal mixer to prepare a slurry.

Next, the prepared slurry was applied onto both surfaces of a current collector made of aluminum foil having a thickness of 15 μm. An amount of application per face of the current collector was 200 g/m². Next, the applied coat was dried and pressed, thereby producing a positive electrode provided with a positive electrode active material-containing layer with a density of 3.3 g/cm³. The slurry of LZCP particles similar to that used for the composite separator of Example 1 was applied onto the produced positive electrode and dried, and then press processing was performed so that the LZCP layer had a thickness of 2 μm.

[Production of Negative Electrode]

Graphite was prepared as an active material. Carboxymethyl cellulose (CMC) and styrene-butadiene rubber (SBR) were prepared as binder. The graphite, CMC, and SBR were added at a mixing ratio of 97 parts by mass:1.5 parts by mass:1.5 parts by mass into pure water as solvent, and mixed. Then, the resulting mixture was dispersed using a planetary centrifugal mixer to yield a slurry.

Next, the prepared slurry was applied onto both faces of a current collector made of copper foil having a thickness of 12 μm. An amount of application was 105 g/m² per face of the current collector. Then, the applied coat was dried, and pressing was performed, thereby producing a negative electrode provided with a negative electrode active material-containing layer having a density of 1.6 g/cm³. On to the produced negative electrode was applied the same slurry as that applied onto the positive electrode, and after drying the slurry, a pressing treatment was performed such that the thickness of the LZCP layer would be 2 μm.

[Production of Electrode Group]

A separator made of a polyethylene porous film having a thickness of 10 μm was prepared. Next, plural positive electrode pieces were punched out from the above positive electrode, each having dimensions of 50 mm length and 50 mm width. In a similar manner, plural negative electrode pieces were punched out from the above negative electrode, each having dimensions of 50 mm length and 50 mm width. The thus prepared plural positive electrode pieces, plural negative electrode pieces, and separator were stacked in such a manner that the separator was folded in zigzag, and these components were arranged in an order where the separator is placed on a negative electrode piece, a positive electrode piece is placed thereon, and the separator is placed further on top. Thereby, an electrode stack was obtained. Subsequently, the electrode stack was heat-pressed at 80° C. In a similar manner as in Example 1, the positive and negative electrode terminals were connected to the electrode stack, thereby obtaining an electrode group.

Example 19

A battery was produced in a similar manner as in Example 18 except that the thickness of the LZCP layer applied respectively onto the positive and negative electrodes was changed to 5 μm, and that the polyethylene separator was omitted.

Example 20

A battery was produced in a similar manner as in Example 4 except that, as in Example 19, the LZCP layer having a thickness of 5 μm was formed on each of the positive and negative electrodes, instead of using the composite separator.

Comparative Example 1

A battery was produced in a similar manner as in Example 1 except for using a separator consisting of the polyethylene porous film having a thickness of 10 μm onto which the solid electrolyte layer was not formed, in place of the composite separator.

Comparative Example 2

A battery was produced in a similar manner as in Example 1 except that when the composite separator was produced, $Al_2O_3$, not LZCP, was applied onto the polyethylene separator substrate.

Comparative Example 3

A battery was produced in a similar manner as in Example 1 except that the conditions of the first storing treatment in the Mn-containing substance formation process were changed as follows. In the thermostatic bath set to 25° C., the assembled battery was charged at a constant current of 0.1 C up to 4.3 V, and after reaching 4.3 V, charged at a constant voltage for 2 hours. The battery whose state of charge (SOC) was thus adjusted to 100% was moved into a thermostatic bath set to 70° C., and stored for 24 hours.

Comparative Example 4

A battery was produced in a similar manner as in Example 1 except that the conditions of the first storing treatment in the Mn-containing substance formation process were changed as follows. In the thermostatic bath set to 25° C., the assembled battery was charged at a constant current of 0.1 C up to a state of charge of 60%. The battery was moved into a thermostatic bath set to 45° C., and stored for 24 hours.

Comparative Example 5

A battery was produced in a similar manner as in Example 1 except that the conditions of the second storing treatment in the Mn-containing substance formation process were changed as follows. In the thermostatic bath set to 25° C., the assembled battery was charged at a constant current of 0.1 C up to 4.3 V, and after reaching 4.3 V, charged at a constant voltage for 2 hours. The battery whose state of charge (SOC) was thus adjusted to 100% was moved into a thermostatic bath set to 45° C., and stored for 5 hours. After this first storing treatment, the battery was discharged at a constant current of 0.1 C to 2.5 V in a thermostatic bath set to 25° C., and held in an open circuit state for 30 minutes. Thereafter, the battery was charged again at a constant current of 0.1 C up to 4.3 V and after reaching 4.3 V, charged at constant voltage for 2 hours. The battery whose state of charge was readjusted to 100% in this manner was moved into a thermostatic bath set to 60° C., and stored for 12 hours, thereby performing the second storing treatment.

Comparative Example 6

A battery was produced in a similar manner as in Example 1 except that the conditions of the second storing treatment in the Mn-containing substance formation process were changed as follows. In the thermostatic bath set to 25° C., the assembled battery was charged at a constant current of 0.1 C up to 4.3 V, and after reaching 4.3 V, charged at a constant voltage for 2 hours. The battery whose state of charge (SOC) was thus adjusted to 100% was moved into a thermostatic bath set to 45° C., and stored for 5 hours. After this first storing treatment, the battery was discharged at a constant current of 0.1 C to 2.5 V in a thermostatic bath set to 25° C., and held in an open circuit state for 30 minutes. Thereafter, the battery was charged again at a constant current of 0.1 C to a state of charge of 20%. The battery was moved into a thermostatic bath set to 45° C., and stored for 12 hours, thereby performing the second storing treatment.

Tables 1 to 3 below summarize the preparation condition of each battery in Examples 1 to 20 and Comparative Examples 1 to 6. Table 1 shows the active material composition, the amount of slurry applied onto the current collector, and the density of the active material-containing layer respectively for the positive electrode and the negative electrode. Table 2 shows the details of the nonaqueous electrolyte and the insulating layer. As details of the nonaqueous electrolyte, the solvent and the electrolyte salt used are shown. As details of the insulating layer, the type of the separator substrate, the species of the solid electrolyte particles used for the solid electrolyte layer and the position where the solid electrolyte layer was provided, and the thickness of the solid electrolyte layer are shown. Table 3 shows the state of charge (SOC) of the battery, the storing temperature, and the storing time respectively in the first and second storing treatments

TABLE 1

| | Positive Electrode | | | Negative Electrode | | |
|---|---|---|---|---|---|---|
| | Active Material Composition | Amount of Slurry Applied (g/m$^2$) | Density of Active Material-Containing Layer (g/cm$^3$) | Active Material Composition | Amount of Slurry Applied (g/m$^2$) | Density of Active Material-Containing Layer (g/cm$^3$) |
| Example 1 | LiNi$_{0.8}$Co$_{0.1}$Mn$_{0.1}$O$_2$ | 250 | 3.3 | graphite | 150 | 1.6 |
| Example 2 | LiNi$_{0.6}$Co$_{0.2}$Mn$_{0.2}$O$_2$ | 200 | 3.3 | graphite | 110 | 1.6 |
| Example 3 | LiNi$_{0.5}$Co$_{0.2}$Mn$_{0.3}$O$_2$ | 200 | 3.3 | graphite | 105 | 1.6 |
| Example 4 | LiNi$_{0.5}$Co$_{0.2}$Mn$_{0.3}$O$_2$ | 200 | 3.3 | Li$_4$Ti$_5$O$_{12}$ | 200 | 2.3 |

TABLE 1-continued

|  | Positive Electrode | | | Negative Electrode | | |
| --- | --- | --- | --- | --- | --- | --- |
|  | Active Material Composition | Amount of Slurry Applied ($g/m^2$) | Density of Active Material-Containing Layer ($g/cm^3$) | Active Material Composition | Amount of Slurry Applied ($g/m^2$) | Density of Active Material-Containing Layer ($g/cm^3$) |
| Example 5 | $LiNi_{0.8}Co_{0.1}Mn_{0.1}O_2$ | 250 | 3.3 | graphite | 150 | 1.6 |
| Example 6 | $LiNi_{0.8}Co_{0.1}Mn_{0.1}O_2$ | 250 | 3.3 | graphite | 150 | 1.6 |
| Example 7 | $LiNi_{0.8}Co_{0.1}Mn_{0.1}O_2$ | 250 | 3.3 | graphite | 150 | 1.6 |
| Example 8 | $LiNi_{0.8}Co_{0.1}Mn_{0.1}O_2$ | 250 | 3.3 | graphite | 150 | 1.6 |
| Example 9 | $LiNi_{0.8}Co_{0.1}Mn_{0.1}O_2$ | 250 | 3.3 | graphite | 150 | 1.6 |
| Example 10 | $LiNi_{0.8}Co_{0.1}Mn_{0.1}O_2$ | 250 | 3.3 | graphite | 150 | 1.6 |
| Example 11 | $LiNi_{0.5}Co_{0.2}Mn_{0.3}O_2$ | 100 | 3.3 | graphite | 52.5 | 1.6 |
| Example 12 | $LiNi_{0.5}Co_{0.2}Mn_{0.3}O_2$ | 100 | 3.3 | $Li_4Ti_5O_{12}$ | 100 | 2.3 |
| Example 13 | $LiNi_{0.8}Co_{0.1}Mn_{0.1}O_2$ | 250 | 3.3 | graphite | 150 | 1.6 |
| Example 14 | $LiNi_{0.8}Co_{0.1}Mn_{0.1}O_2$ | 250 | 3.3 | graphite | 150 | 1.6 |
| Example 15 | $LiNi_{0.8}Co_{0.1}Mn_{0.1}O_2$ | 250 | 3.3 | graphite | 150 | 1.6 |
| Example 16 | $LiNi_{0.8}Co_{0.1}Mn_{0.1}O_2$ | 250 | 3.3 | graphite | 150 | 1.6 |
| Example 17 | $LiNi_{0.8}Co_{0.1}Mn_{0.1}O_2$ | 250 | 3.3 | graphite | 150 | 1.6 |
| Example 18 | $LiNi_{0.5}Co_{0.2}Mn_{0.3}O_2$ | 200 | 3.3 | graphite | 105 | 1.6 |
| Example 19 | $LiNi_{0.5}Co_{0.2}Mn_{0.3}O_2$ | 200 | 3.3 | graphite | 105 | 1.6 |
| Example 20 | $LiNi_{0.5}Co_{0.2}Mn_{0.3}O_2$ | 200 | 3.3 | $Li_4Ti_5O_{12}$ | 200 | 2.3 |
| Comparative Example 1 | $LiNi_{0.8}Co_{0.1}Mn_{0.1}O_2$ | 250 | 3.3 | graphite | 150 | 1.6 |
| Comparative Example 2 | $LiNi_{0.8}Co_{0.1}Mn_{0.1}O_2$ | 250 | 3.3 | graphite | 150 | 1.6 |
| Comparative Example 3 | $LiNi_{0.8}Co_{0.1}Mn_{0.1}O_2$ | 250 | 3.3 | graphite | 150 | 1.6 |
| Comparative Example 4 | $LiNi_{0.8}Co_{0.1}Mn_{0.1}O_2$ | 250 | 3.3 | graphite | 150 | 1.6 |
| Comparative Example 5 | $LiNi_{0.8}Co_{0.1}Mn_{0.1}O_2$ | 250 | 3.3 | graphite | 150 | 1.6 |
| Comparative Example 6 | $LiNi_{0.8}Co_{0.1}Mn_{0.1}O_2$ | 250 | 3.3 | graphite | 150 | 1.6 |

TABLE 2

|  | Nonaqueous Electrolyte | Insulating Layer | | |
| --- | --- | --- | --- | --- |
|  | Solvent/ Electrolyte Salt | Separator Substrate | Solid Electrolyte Layer/Position | Thickness of Solid Electrolyte Layer (μm) |
| Example 1 | EC + DEC/$LiPF_6$ | 10 μm thick PE separator | LZCP/both substrate surfaces | 2 (both surfaces) |
| Example 2 | EC + DEC/$LiPF_6$ | 10 μm thick PE separator | LZCP/both substrate surfaces | 2 (both surfaces) |
| Example 3 | EC + DEC/$LiPF_6$ | 10 μm thick PE separator | LZCP/both substrate surfaces | 2 (both surfaces) |
| Example 4 | EC + DEC/$LiPF_6$ | 10 μm thick PE separator | LZCP/both substrate surfaces | 2 (both surfaces) |
| Example 5 | EC + DEC/$LiPF_6$ | 10 μm thick PE separator | LZCP/substrate surface on negative electrode side | 3 |
| Example 6 | EC + DEC/$LiPF_6$ | 10 μm thick PE separator | LZCP/both substrate surfaces | 2 (both surfaces) |
| Example 7 | EC + DEC/$LiPF_6$ | 10 μm thick PE separator | LZCP/both substrate surfaces | 2 (both surfaces) |
| Example 8 | EC + DEC/$LiPF_6$ | 10 μm thick PE separator | LZCP/both substrate surfaces | 2 (both surfaces) |
| Example 9 | EC + DEC/$LiPF_6$ | 10 μm thick PE separator | LZCP/both substrate surfaces | 2 (both surfaces) |
| Example 10 | EC + DEC/$LiPF_6$ | 10 μm thick PE separator | LZCP/both substrate surfaces | 2 (both surfaces) |
| Example 11 | EC + DEC/$LiPF_6$ | 10 μm thick PE separator | LZCP/both substrate surfaces | 2 (both surfaces) |
| Example 12 | EC + DEC/$LiPF_6$ | 10 μm thick PE separator | LZCP/both substrate surfaces | 2 (both surfaces) |
| Example 13 | EC + DEC/$LiPF_6$ | 10 μm thick PE separator | LATP/both substrate surfaces | 2 (both surfaces) |
| Example 14 | EC + DEC/$LiPF_6$ | 10 μm thick PE separator | LAGP/both substrate surfaces | 2 (both surfaces) |

TABLE 2-continued

| | Nonaqueous Electrolyte Solvent/ Electrolyte Salt | Insulating Layer | | |
|---|---|---|---|---|
| | | Separator Substrate | Solid Electrolyte Layer/Position | Thickness of Solid Electrolyte Layer (μm) |
| Example 15 | EC + DEC/LiPF$_6$ | 10 μm thick PE separator | LLZ/both substrate surfaces | 2 (both surfaces) |
| Example 16 | EC + DEC/LiPF$_6$ | 10 μm thick PE separator | LLT/both substrate surfaces | 2 (both surfaces) |
| Example 17 | EC + DEC/LiPF$_6$ | 10 μm thick cellulose separator | LZCP/both substrate surfaces | 2 (both surfaces) |
| Example 18 | EC + DEC/LiPF$_6$ | 10 μm thick PE separator | LZCP/ positive and negative electrode surfaces | 2 (on surfaces of both electrodes) |
| Example 19 | EC + DEC/LiPF$_6$ | (no substrate) | LZCP/ positive and negative electrode surfaces | 5 (on surfaces of both electrodes) |
| Example 20 | EC + DEC/LiPF$_6$ | (no substrate) | LZCP/ positive and negative electrode surfaces | 5 (on surfaces of both electrodes) |

TABLE 3

Conditions of Mn-containing Layer Formation

| | First Storing Treatment | | | Second Storing Treatment | | |
|---|---|---|---|---|---|---|
| | SOC (%) | Storing Temperature (° C.) | Storing Time (h) | SOC (%) | Storing Temperature (° C.) | Storing Time (h) |
| Example 1 | 100 | 45 | 5 | 50 | 12 | 12 |
| Example 2 | 100 | 45 | 5 | 50 | 45 | 12 |
| Example 3 | 100 | 45 | 5 | 50 | 45 | 12 |
| Example 4 | 100 | 45 | 5 | 50 | 45 | 12 |
| Example 5 | 100 | 45 | 5 | 50 | 45 | 12 |
| Example 6 | 100 | 60 | 3 | 34 | 45 | 12 |
| Example 7 | 100 | 25 | 48 | 34 | 45 | 12 |
| Example 8 | 90 | 45 | 12 | 50 | 45 | 12 |
| Example 9 | 100 | 45 | 5 | 50 | 60 | 10 |
| Example 10 | 100 | 45 | 5 | 80 | 30 | 15 |
| Example 11 | 100 | 45 | 5 | 50 | 45 | 12 |
| Example 12 | 100 | 45 | 5 | 50 | 45 | 12 |
| Example 13 | 100 | 45 | 5 | 50 | 45 | 12 |
| Example 14 | 100 | 45 | 5 | 50 | 45 | 12 |
| Example 15 | 100 | 45 | 5 | 50 | 45 | 12 |
| Example 16 | 100 | 45 | 5 | 50 | 45 | 12 |
| Example 17 | 100 | 45 | 5 | 50 | 45 | 12 |
| Example 18 | 100 | 45 | 5 | 50 | 45 | 12 |
| Example 19 | 100 | 45 | 5 | 50 | 45 | 12 |
| Example 20 | 100 | 45 | 5 | 50 | 45 | 12 |
| Comparative Example 1 | 100 | 45 | 5 | 50 | 45 | 12 |
| Comparative Example 2 | 100 | 45 | 5 | 50 | 45 | 12 |
| Comparative Example 3 | 100 | 70 | 24 | 50 | 45 | 12 |
| Comparative Example 4 | 60 | 45 | 24 | 50 | 45 | 12 |
| Comparative Example 5 | 100 | 45 | 5 | 100 | 60 | 12 |
| Comparative Example 6 | 100 | 45 | 5 | 20 | 45 | 12 |

[Measurement of Mn-Containing Substance]

By the method described above, for each battery obtained in each of Examples 1 to 20 and Comparative Examples 1 to 6, the Mn-containing substance at the boundary between the negative electrode and the insulating layer was measured. Table 4 below shows the Mn abundance ratio on the negative electrode side and the Mn abundance ratio on the solid electrolyte side at the boundary measured.

[Evaluation]

For the battery obtained in each of Examples 1 to 20 and Comparative Examples 1 to 6, 0.5 C cycle test was carried out in an environment of 45° C. For the batteries of Examples 1 to 3, 5 to 11, and 13 to 19 and Comparative Examples 1 to 6, i.e., the batteries using graphite as the negative electrode active material, charge and discharge were repeated for 200 cycles in the battery voltage range of 2.5 V to 4.2 V. For the batteries of Examples 4, 12 and 20, i.e., the batteries using $Li_4Ti_5O_{12}$ as the negative electrode active material, charge and discharge were repeated for 200 cycles in the battery voltage range of 1.5 V to 2.7 V.

For each battery, after performing the 200 cycles of charge and discharge, the discharge capacity was measured again. The re-measured discharge capacity was divided by the discharge capacity before performing the 200 cycles of charge and discharge to calculate a capacity retention ratio ("capacity retention ratio after 200 cycles"=[(discharge capacity after 200 cycles)/(discharge capacity before the 200 cycles)]×100%). The results are shown in Table 4 below.

TABLE 4

| | Mn Abundance Ratio on Negative Electrode-side (atom %) | Mn Abundance Ratio on Solid Electrolyte-side (atom %) | Capacity Retention Ratio After 200 cycles of 45° C., 0.5 C Charge-and-discharge Cycles (%) |
|---|---|---|---|
| Example 1 | 0.4 | 1.1 | 71 |
| Example 2 | 0.3 | 1 | 80 |
| Example 3 | 0.3 | 1.1 | 83 |
| Example 4 | 0.3 | 0.9 | 96 |
| Example 5 | 0.4 | 1.2 | 70 |
| Example 6 | 0.5 | 1.3 | 73 |
| Example 7 | 0.3 | 1 | 70 |
| Example 8 | 0.3 | 0.9 | 69 |
| Example 9 | 0.4 | 1.3 | 69 |
| Example 10 | 0.3 | 0.9 | 68 |
| Example 11 | 0.3 | 1.1 | 86 |
| Example 12 | 0.3 | 1 | 97 |
| Example 13 | 0.4 | 1.2 | 71 |
| Example 14 | 0.4 | 1.1 | 70 |
| Example 15 | 0.5 | 1 | 69 |
| Example 16 | 0.4 | 1 | 69 |
| Example 17 | 0.4 | 1.2 | 70 |

TABLE 4-continued

| | Mn Abundance Ratio on Negative Electrode-side (atom %) | Mn Abundance Ratio on Solid Electrolyte-side (atom %) | Capacity Retention Ratio After 200 cycles of 45° C., 0.5 C Charge-and-discharge Cycles (%) |
|---|---|---|---|
| Example 18 | 0.3 | 1 | 84 |
| Example 19 | 0.3 | 1.1 | 83 |
| Example 20 | 0.3 | 0.9 | 96 |
| Comparative Example 1 | 0.8 | — | 62 |
| Comparative Example 2 | 0.7 | 0.4 | 63 |
| Comparative Example 3 | 1.2 | 1 | 60 |
| Comparative Example 4 | 0.2 | 0.2 | 65 |
| Comparative Example 5 | 0.7 | 0.5 | 61 |
| Comparative Example 6 | 0.4 | 0.3 | 64 |

As shown by Table 4, in the nonaqueous electrolyte batteries of Examples 1 to 20, the Mn abundance ratio on the surface (second surface) of the solid electrolyte side is higher as compared to the surface (first surface) of the negative electrode side. The cycle test results in Table 4 show that the nonaqueous electrolyte batteries of Examples 1 to 20 demonstrated superior cycle life performance than those of Comparative Examples 1 to 6.

In Comparative Example 1, the solid electrolyte was not used. In Comparative Example 2, instead of the solid electrolyte, $Al_2O_3$ as an insulating inorganic oxide not exhibiting Li ion conductivity was used. In the battery of Comparative Example 2, the amount of Mn was greater on the negative electrode side than that on the insulating layer side. Note, that although $Al_2O_3$ is not a solid electrolyte, for the sake of convenience, in Table 4, the Mn abundance ratio on the surface of the $Al_2O_3$ layer of the composite separator as the insulating layer is displayed in the column of "Mn Abundance Ratio on Solid Electrolyte-side". The comparison between the test results of Examples 1 to 20 and those of Comparative Examples 1 and 2 show that the cycle life performance can be improved by providing the solid electrolyte layer that faces the negative electrode surface. One presumable reason for why the cycle life performance in Comparative Examples 1 and 2 was low is that the effect of attracting the solvent molecules and electrolyte anions in the nonaqueous electrolyte was not provided because no solid electrolyte was contained in the insulating layer In Comparative Examples 3 to 6, even though the solid electrolyte layer was used, in the obtained battery, the amount of Mn was greater on the negative electrode side, or the same amount of Mn was present on the negative electrode side and the solid electrolyte side. The comparison between Table 3 and Table 4 shows that the conditions of the first and second storing treatments affect the distribution of Mn between the surface (first surface) on the negative electrode side and the surface (second surface) on the solid electrolyte side. The comparison between the test results of Examples 1 to 20 and those of Comparative Examples 3 to 6 show that the cycle life performance is improved by making the Mn abundance ratio on the surface (second surface) on the solid electrolyte side higher than that on the surface (first surface) on the negative electrode side.

According to at least one embodiment and example described above, a secondary battery is provided. The secondary battery includes a positive electrode, a negative electrode, an insulating layer, and a nonaqueous electrolyte. The positive electrode includes a positive electrode active material-containing layer containing a lithium nickel cobalt manganese composite oxide. The negative electrode includes a negative electrode active material-containing layer with a first surface. The insulating layer includes a solid electrolyte layer with a second surface that at least partially faces opposite to or is partially in contact with the first surface of the negative electrode active material layer. The solid electrolyte layer contains a Li ion conductive oxide. For the second surface or both the first and second surfaces, a Mn-containing substance is present on at least apart thereof. An abundance ratio of Mn on the second surface is higher than an abundance ratio of Mn on the first surface. According to the secondary battery, there can be provided a secondary battery and battery pack capable of exhibiting an excellent cycle life performance, and a vehicle installed with the battery pack.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. A secondary battery, comprising:
   a positive electrode, the positive electrode comprising a positive electrode active material-containing layer, the positive electrode active material-containing layer comprising a lithium nickel cobalt manganese composite oxide;
   a negative electrode comprising a negative electrode active material-containing layer having a first surface;
   an insulating layer comprising a solid electrolyte layer having a second surface, the solid electrolyte layer comprising a Li ion conductive oxide; and
   a nonaqueous electrolyte,
   the first surface and the second surface at least partially facing one another or at least partially in contact with one another, at least part of the second surface or at least parts of the first surface and the second surface comprising a Mn-containing substance, and an abundance ratio of Mn on the second surface being higher than an abundance ratio of Mn on the first surface, the abundance ratio of Mn on the first surface being from 0 atom % to 0.5 atom %, and the abundance ratio of Mn on the second surface being from 0.9 atom % to 1.3 atom %.

2. The secondary battery according to claim 1, wherein a ratio of the abundance ratio of Mn on the first surface with respect to the abundance ratio of Mn on the second surface is 0 or more and 0.3 or less.

3. The secondary battery according to claim 1, wherein the lithium nickel cobalt manganese composite oxide comprises a compound represented by $Li_wNi_{1-x-y}Co_xMn_yO_2$ and satisfying $0 < w \leq 1$, $0.05 < x < 0.25$, and $0.05 < y < 0.2$.

4. The secondary battery according to claim 1, wherein the negative electrode active material-containing layer comprises a negative electrode active material comprising a carbon material.

5. The secondary battery according to claim 1, wherein the insulating layer further comprises a separator substrate, at least one surface of the separator substrate is provided with the solid electrolyte layer, the separator substrate has a thickness of 5 μm or more and 10 μm or less, and the solid electrolyte layer has a thickness of 2 μm or more and 4 μm or less per face of the separator substrate.

6. The secondary battery according to claim 1, wherein the positive electrode active material-containing layer has a mass per unit area of 200 $g/m^2$ or more and 500 $g/m^2$ or less, and the negative electrode active material-containing layer has a mass per unit area of 130 $g/m^2$ or more and 300 $g/m^2$ or less.

7. A battery pack comprising the secondary battery according to claim 1.

8. The battery pack according to claim 7, further comprising an external power distribution terminal and a protective circuit.

9. The battery pack according to claim 7, comprising plural of the secondary battery, the secondary batteries being electrically connected in series, in parallel, or in combination of in-series connection and in-parallel connection.

10. A vehicle comprising the battery pack according to of claim 7.

11. The vehicle according to claim 10, wherein the vehicle comprises a mechanism configured to convert kinetic energy of the vehicle into regenerative energy.

12. The secondary battery according to claim 1, wherein the abundance ratio of Mn on the first surface is from 0.3 atom % to 0.5 atom %.

\* \* \* \* \*